(12) United States Patent  (10) Patent No.: US 8,724,447 B2
Gupta  (45) Date of Patent: *May 13, 2014

(54) TIMING ESTIMATION IN AN OFDM RECEIVER

(75) Inventor: Alok Kumar Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1142 days.

This patent is subject to a terminal disclaimer.

(21) Appl. No.: 11/752,927

(22) Filed: May 24, 2007

(65) Prior Publication Data

US 2008/0291817 A1  Nov. 27, 2008

Related U.S. Application Data

(63) Continuation of application No. 11/046,120, filed on Jan. 28, 2005, now Pat. No. 7,236,554.

(60) Provisional application No. 60/540,086, filed on Jan. 28, 2004.

(51) Int. Cl.
*H04J 11/00* (2006.01)

(52) U.S. Cl.
USPC ........................................ 370/208

(58) Field of Classification Search
None
See application file for complete search history.

(56) References Cited

U.S. PATENT DOCUMENTS

| | | |
|---|---|---|
| 4,607,257 A | 8/1986 | Noguchi |
| 5,583,961 A * | 12/1996 | Pawlewski et al. ........... 704/241 |
| 5,732,113 A | 3/1998 | Schmidl et al. |
| 6,069,915 A | 5/2000 | Hulbert |
| 6,151,295 A | 11/2000 | Ma et al. |
| 6,597,729 B1 | 7/2003 | Schmidl et al. |
| 6,631,160 B2 | 10/2003 | Piirainen et al. |
| 6,925,112 B1 | 8/2005 | Morejon et al. |
| 7,016,397 B1 | 3/2006 | Vihriala |
| 7,050,511 B2 | 5/2006 | Jeong et al. |
| 7,068,593 B2 | 6/2006 | Cho et al. |

(Continued)

FOREIGN PATENT DOCUMENTS

| CL | 2230-2004 | 9/2004 |
|---|---|---|
| CN | 1957551 A | 5/2007 |

(Continued)

OTHER PUBLICATIONS

Written Opinion, PCT/US2005/002544, International Searching Authority, European Patent Office, May 24, 2005.

(Continued)

*Primary Examiner* — Nicholas Sloms

(74) *Attorney, Agent, or Firm* — Fulbright & Jaworski LLP

(57) ABSTRACT

A timing estimation system and methodology are provided. In particular, a first pilot is employed in conjunction with three acquisition stages. In the first stage, an attempt is made to observe the leading edge the correlation curve associated with the first pilot symbol. In the second stage, a determination is made to confirm a leading edge was detected in the first stage by attempting to observe a trailing edge the correlation curve. Furthermore, during this second stage, a frequency loop is updated to account for frequency offset. The third stage is for observing the trailing edge the curve if it was not already observed in stage two. Upon detection receipt the first pilot, a second pilot can subsequently be employed to acquire fine symbol timing.

20 Claims, 24 Drawing Sheets

(56) References Cited

U.S. PATENT DOCUMENTS

| | | | |
|---|---|---|---|
| 7,133,457 | B2 | 11/2006 | Singh et al. |
| 7,218,691 | B1 | 5/2007 | Narasimhan |
| 7,221,680 | B2 | 5/2007 | Vijayan et al. |
| 7,236,554 | B2* | 6/2007 | Gupta ............... 375/355 |
| 7,366,087 | B2 | 4/2008 | Lee et al. |
| 2002/0181390 | A1 | 12/2002 | Mody et al. |
| 2003/0117943 | A1* | 6/2003 | Sakata et al. ........ 370/210 |
| 2004/0005018 | A1 | 1/2004 | Zhu et al. |
| 2004/0223449 | A1 | 11/2004 | Tsuie et al. |
| 2004/0252777 | A1 | 12/2004 | Suh et al. |
| 2004/0257979 | A1 | 12/2004 | Ro et al. |
| 2005/0063298 | A1 | 3/2005 | Ling et al. |
| 2005/0163262 | A1* | 7/2005 | Gupta ............... 375/343 |
| 2005/0163263 | A1 | 7/2005 | Gupta et al. |
| 2005/0163265 | A1* | 7/2005 | Gupta ............... 375/343 |
| 2006/0014494 | A1* | 1/2006 | Vanderperren et al. ...... 455/63.1 |
| 2006/0176082 | A1* | 8/2006 | Johnstone et al. ........ 327/1 |
| 2006/0209927 | A1 | 9/2006 | Khandekar et al. |
| 2009/0190675 | A1 | 7/2009 | Ling et al. |

FOREIGN PATENT DOCUMENTS

| | | |
|---|---|---|
| CN | 101032139 | 9/2007 |
| EP | 0959568 | 11/1999 |
| FR | 2830392 | 4/2003 |
| JP | 7321763 | 12/1995 |
| JP | 1022973 | 1/1998 |
| JP | 2000-115122 | 4/2000 |
| JP | 2000138647 | 5/2000 |
| JP | 2000332725 | 11/2000 |
| JP | 2000-341244 | 12/2000 |
| JP | 2001-069119 | 3/2001 |
| JP | 2001103033 | 4/2001 |
| JP | 2001156743 | 6/2001 |
| JP | 2002-135226 | 5/2002 |
| JP | 2002-204214 | 7/2002 |
| JP | 2002261728 | 9/2002 |
| JP | 2003-008676 | 1/2003 |
| JP | 2003502903 A | 1/2003 |
| JP | 2003-078959 | 2/2003 |
| JP | 2003-069546 | 3/2003 |
| JP | 2003-115812 | 4/2003 |
| JP | 2003-143106 | 5/2003 |
| JP | 2003-152674 | 5/2003 |
| JP | 2303-304219 | 10/2003 |
| JP | 2003-348048 | 12/2003 |
| JP | 2004-023340 | 1/2004 |
| JP | 2005-080240 | 3/2005 |
| JP | 2005506757 A | 3/2005 |
| JP | 3654185 | 6/2005 |
| JP | 2006-504359 | 2/2006 |
| JP | 2006-507753 | 3/2006 |
| JP | 2006174472 A | 6/2006 |
| JP | 2007514331 A | 5/2007 |
| JP | 2007-520931 | 7/2007 |
| JP | 2007-520167 | 1/2009 |
| JP | 2007-520168 | 1/2009 |
| KR | 101998-703715 | 12/1998 |
| KR | 1019990070745 | 9/1999 |
| KR | 102002-0056807 | 7/2002 |
| KR | 102003-0065083 | 8/2003 |
| KR | 102003-0097040 | 12/2003 |
| RU | 2111619 | 5/1998 |
| RU | 2157059 | 9/2000 |
| RU | 2180159 | 3/2009 |
| TW | I269546 B | 12/2006 |
| WO | 9800946 | 1/1998 |
| WO | 9959254 | 11/1999 |
| WO | WO0065797 | 11/2000 |
| WO | 0077961 | 12/2000 |
| WO | 03028270 | 4/2003 |
| WO | WO03034642 A2 | 4/2003 |
| WO | 03036812 | 5/2003 |
| WO | 2004049618 | 6/2004 |
| WO | 2005022797 | 3/2005 |
| WO | 2004008706 | 3/2008 |

OTHER PUBLICATIONS

International Preliminary Report on Patentability, PCT/US2005/002544, International Preliminary Examining Authority, United States, Apr. 26, 2006.

International Search Report—PCT/US05/002544, International Search Authority—European Patent Office, May 24, 2005.

IEEE Std. 802.11a—1999; Part 11: Wireless LAN Medium Access Control (MAC) and Physical Layer (PHY) Specifications: High-speed Physical Layer in the 5 GHZ Band.

Van de Beek, et al., "ML Estimation of Time and Frequency Offset in OFDM Systems," IEEE Transactions on Signal Processing, vol. 45, No. 7, Jul. 1997.

Yun Chiu et al: "OFDM Receiver Design" Dec. 2000, XP002263353.

Krystic et al., "Optimised low-power synchronizer design for the IEEE 802.11 standard", 2003 Proceedings, (ICASSP), vol. 2, Apr. 6-10, 2003, pp. 333-336.

Nee Van R, et al., "OFDMf for Wireless Multimedia Communications. 5.2.1 Two-Dimensional Channel estimators" OFDM Wireless Multimedia Communications; [Universal Personal Communications], Boston, MA: Artech House, US, Jan. 1, 2000, pp. 96-103.

Yang, et al., "Optimal Pilot Design for Multipath Channel Estimation of a Single Carrier Cyclic Prefix-Assisted CDMA System", Communication Systems, 2002. ICCS 2002, The 8th International Conference NCE on Nov. 25-28, 2002, Piscataway, NJ, USA, IEEE, Vol.

Heiskala, J. et al., "OFDM Wireless LANs: A Theoretical and Practical Guide", Chapter 2, pp. 58 and 61, Sams Publishing, 2002.

* cited by examiner

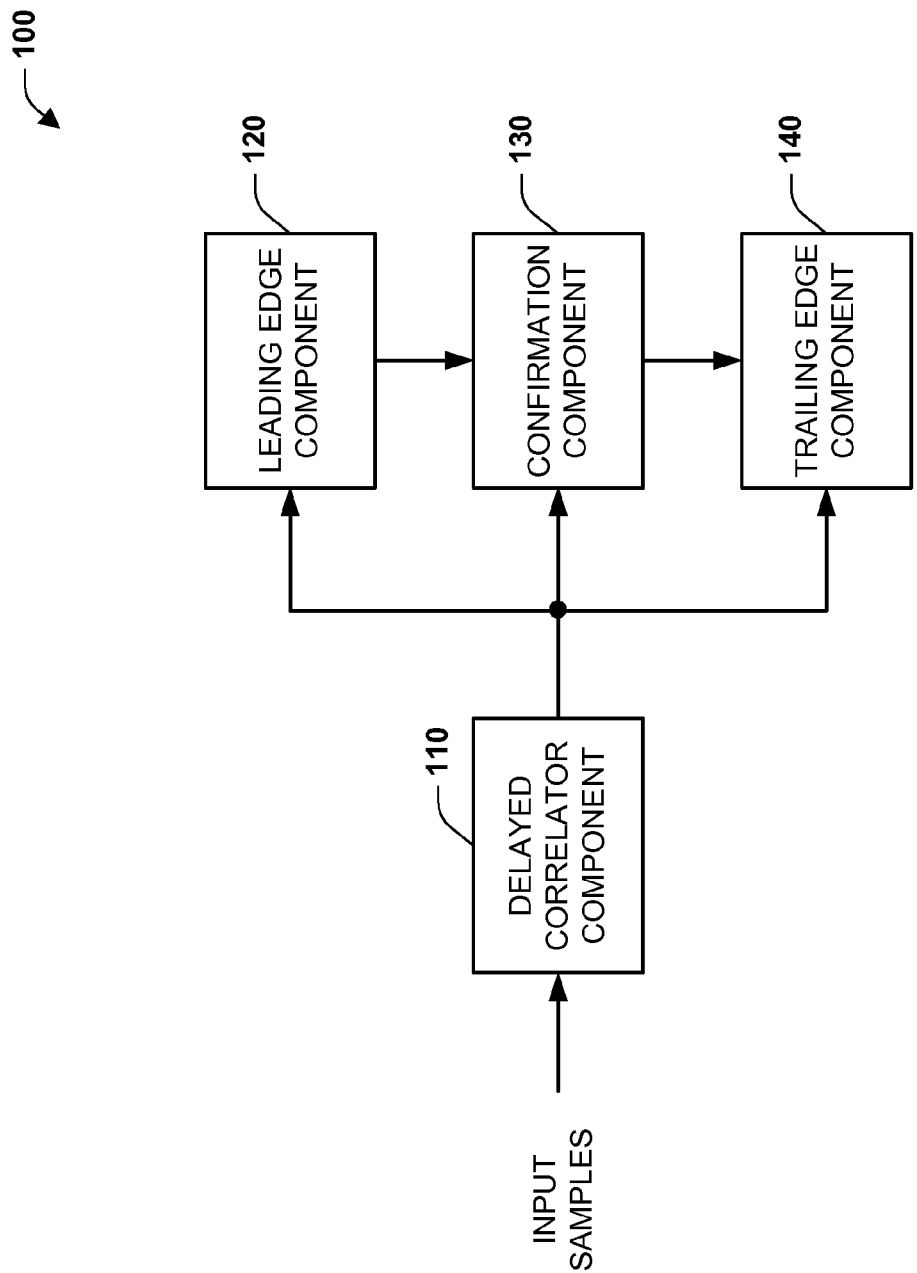

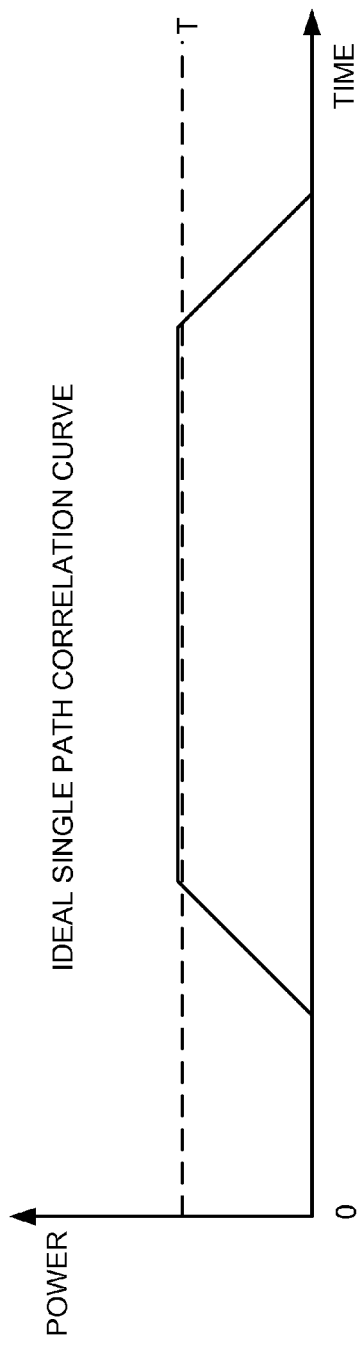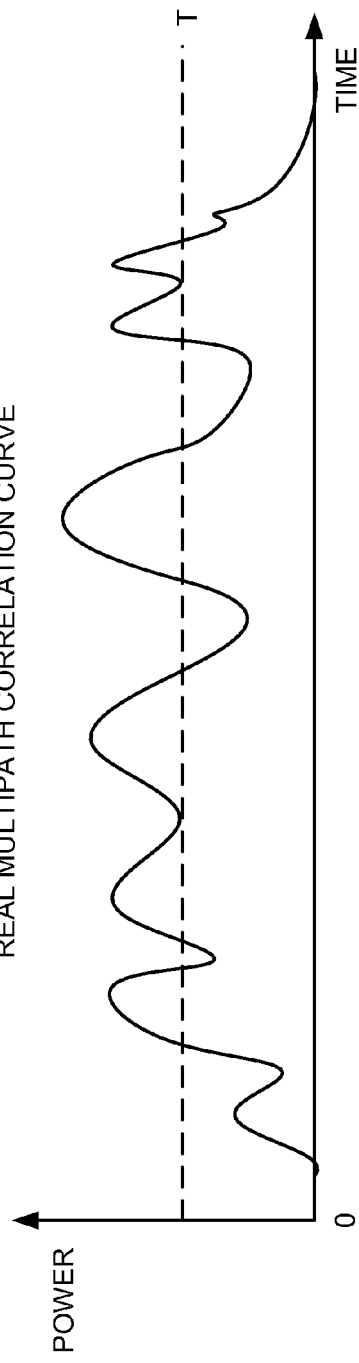

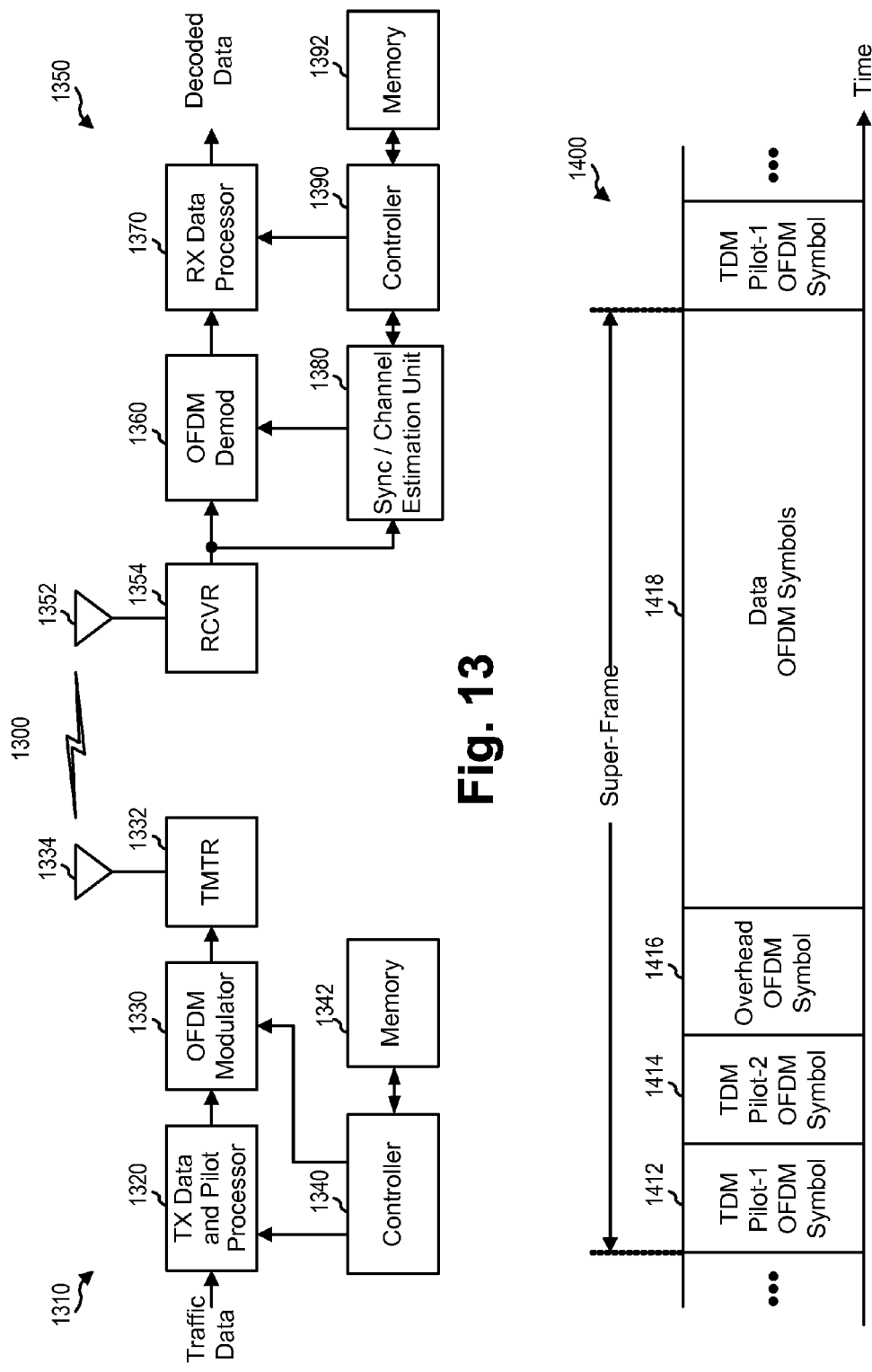

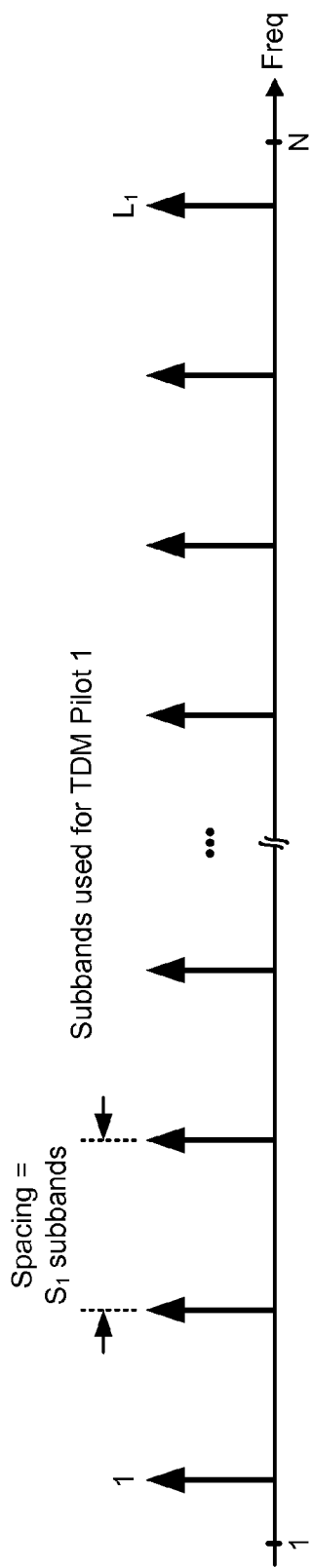
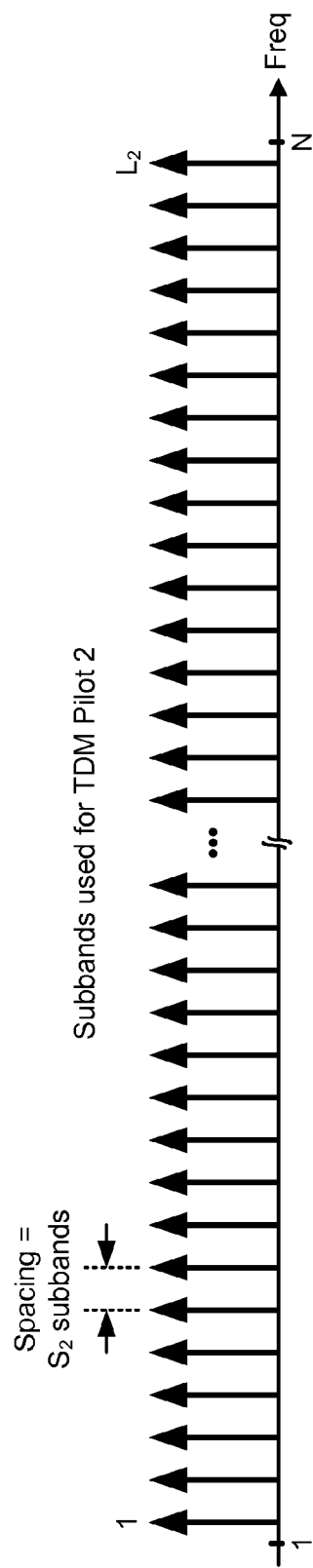

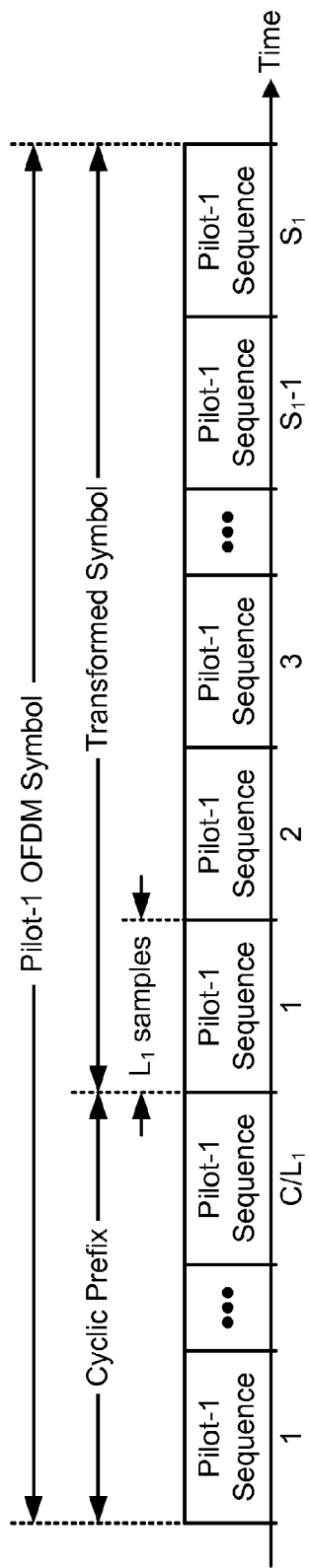
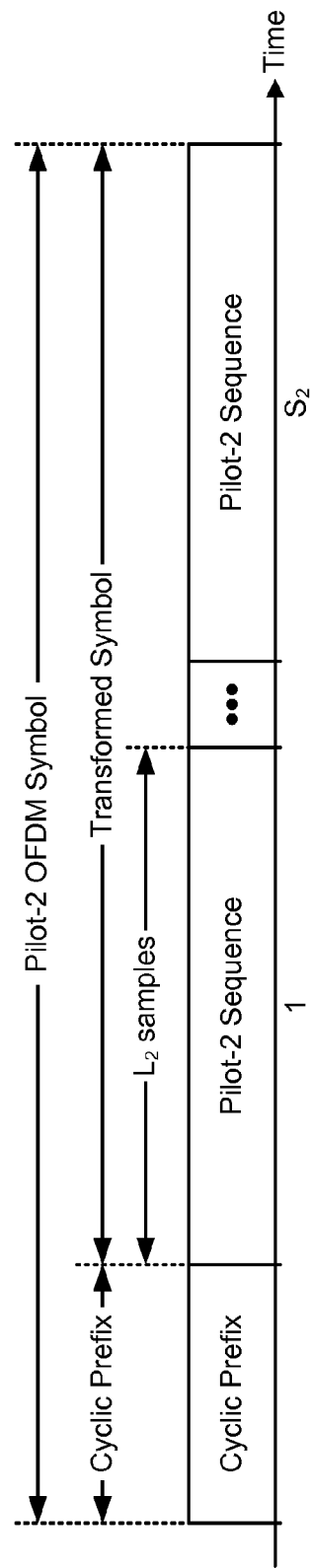
Fig. 18a
Fig. 18b

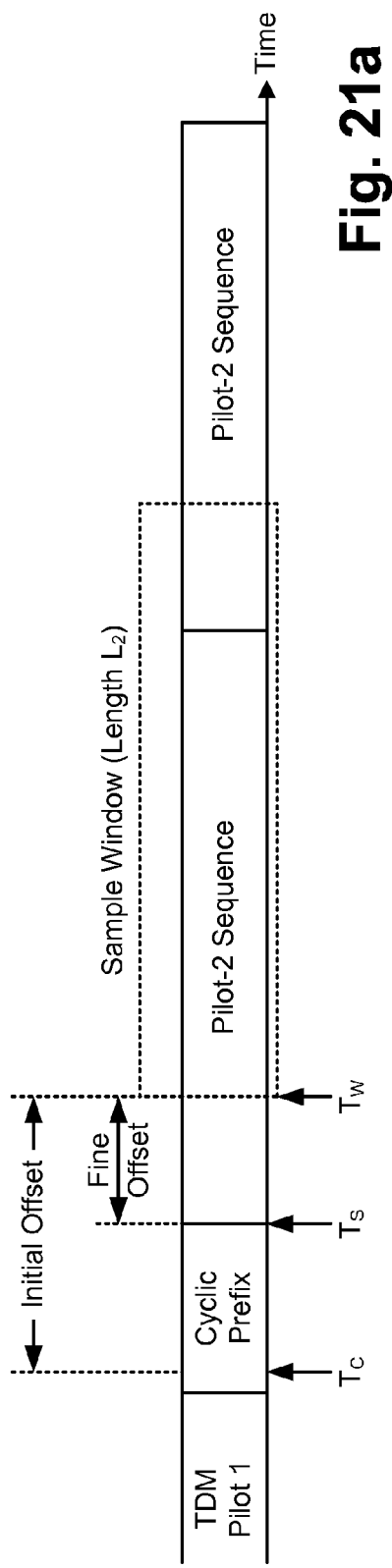
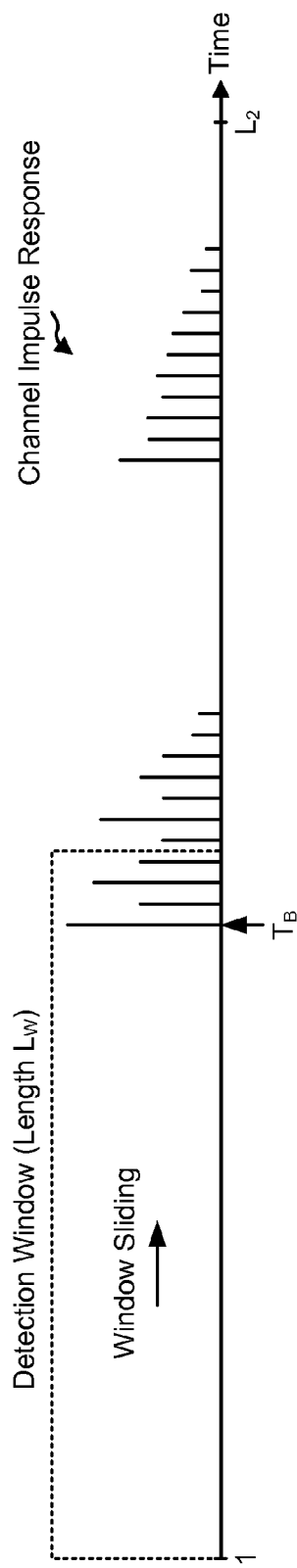
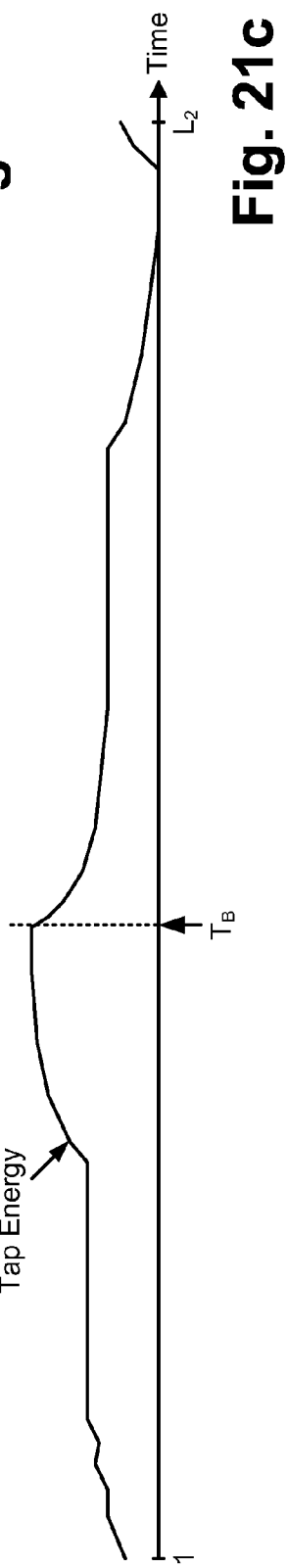
Fig. 21a
Fig. 21b
Fig. 21c

TDM Pilot1 in frequency domain, every 32 sub-carrier is non-zero

TDM Pilot1 in time domain, periodic waveform, periodicity 128 samples, 36 periods TDM Pilot2 in frequency domain, every 4th sub-carrier is non-zero TDM Pilot2 in time domain, periodic waveform, periodicity 1024 samples, 4 periods

TIMING ESTIMATION IN AN OFDM RECEIVER

CLAIM OF PRIORITY UNDER 35 U.S.C. §120

The present Application for Patent is a continuation patent application Ser. No. 11/046,120 010139 entitled "TIMING ESTIMATION IN AN OFDM RECEIVER" filed Jan. 28, 2005, now issued as U.S. Pat. No. 7,236,554, and assigned to the assignee hereand hereby expressly incorporated by reference herein, which claims the benefit U.S. Provisional Application Ser. No. 60/540,086 entitled "Improved Initial Timing Estimation in an OFDM Receiver," filed on Jan. 28, 2004.

REFERENCE TO CO-PENDING APPLICATIONS FOR PATENT

This application is related to U.S. application Ser. No. 11/020,413, entitled "Frame Synchronization and Initial Symbol Timing Acquisition System and Method," filed on Dec. 22, 2004 and is also related to U.S. application Ser. No. 10/931,324, entitled "Synchronization in a Broadcast OFDM System using Time Division Multiplexed Pilots," filed on Aug. 3, 2004. The entireties the aforementioned applications are incorporated herein by reference.

BACKGROUND

I. Field

The following description relates generally to data communication and more particularly toward signal acquisition and synchronization.

II. Background

There is an increasing demand for high capacity and reliable communication systems. Today, data traffic originates primarily from mobile telephones as well as desktop or portable computers. As time passes and technology evolves, it is foreseeable that there will be increased demand from other communication devices some which have not been developed as yet. For example, devices not currently thought as communication devices such as appliances as well other consumer devices, will generate huge amounts data for transmission. Furthermore, present day devices such as mobile phones and personal digital assistants (PDAs), among others, will not only be more prevalent but also demand unprecedented bandwidth to support large and complex interactive and multimedia applications.

While data traffic can be transmitted by way wire, demand for wireless communication is currently and will continue to skyrocket. The increasing mobility of people our society requires that technology associated therewith be portable as well. Thus, today many people utilize mobile phones and PDAs for voice and data transmission (e.g., mobile web, email, instant messaging . . . ). Additionally, growing numbers people are constructing wireless home and office networks and further expecting wireless hotspots to enable Internet connectivity in schools, coffee houses, airports and other public places. Still further yet, there continues to be a large-scale movement toward integration computer and communication technology in transportation vehicles such as cars, boats, planes, trains, etc. In essence, as computing and communication technologies continue to become more and more ubiquitous demand will continue to increase in the wireless realm in particular as it is often the most practical and convenient communication medium.

In general, the wireless communication process includes both a sender and a receiver. The sender modulates data on a carrier signal and subsequently transmits that carrier signal over a transmission medium (e.g., radio frequency). The receiver is then responsible for receiving the carrier signal over the transmission medium. More particularly, the receiver is tasked with synchronizing the received signal to determine the start a signal, information contained by the signal, and whether or not the signal contains a message. However, synchronization is complicated by noise, interference and other factors. Despite such obstacles, the receiver must still detect or identify the signal and interpret the content to enable communication.

At present, there are many conventional spread frequency modulation technologies being employed. With these technologies, the power a narrow band information signal is spread or enlarged across a large transmission frequency band. This spreading is advantageous at least because such transmissions are generally immune to system noise due to the small spectral power density. However, one known problem with such conventional systems is that multipath delay spread begets interference amongst a plurality users.

One the standards rapidly gaining commercial acceptance is orthogonal frequency division multiplexing (OFDM). OFDM is a parallel transmission communication scheme where a high-rate data stream is split over a large number of lower-rate streams and transmitted simultaneously over multiple sub-carriers spaced apart at particular frequencies or tones. The precise spacing frequencies provides orthogonality between tones. Orthogonal frequencies minimize or eliminate crosstalk or interference amongst communication signals. In addition to high transmission rates, and resistance to interference, high spectral efficiency can be obtained as frequencies can overlap without mutual interference.

However, one problem with OFDM systems is that they are especially sensitive to receiver synchronization errors. This can cause degradation system performance. In particular, the system can lose orthogonality amongst subcarriers and thus network users. To preserve orthogonality, the transmitter and the receiver must be synchronized. In sum, receiver synchronization is paramount to successful OFDM communications.

Accordingly, there is a need for a novel system and method expeditious and reliable initial frame synchronization.

SUMMARY

The following presents a simplified summary in order to provide a basic understanding some aspects and embodiments disclosed hereinafter. This summary is not an extensive overview nor is it intended to identify key/critical elements. Its sole purpose is to present some concepts or principles in a simplified form as a prelude to the more detailed description that is presented later.

In an aspect, a method timing estimation comprises receiving a stream of input signals at least some being associated with a pilot symbol, generating correlation outputs forming a correlation curve from the signals and delayed copies thereof, detecting a potential leading edge the correlation curve from correlation outputs, and detecting a trailing edge the curve from correlation outputs.

In another aspect, a computer implemented method timing estimation comprises receiving broadcast signals that transmit at least a plurality wireless symbols, detecting a potential leading edge a correlator output associated with a first pilot symbol, and detecting a trailing edge the correlator output.

In another aspect, a computer implemented method timing estimation comprises receiving a stream broadcast input signals at least some being associated with a pilot symbol, generating correlation outputs that form a correlation curve over time from the signals and delayed copies thereof, detecting a leading edge the correlation curve, and detecting a trailing edge the correlation curve.

In another aspect, a timing estimation system comprises a delayed correlator component that receives a stream input samples, correlates an input samples with delayed versions thereof, and generates a plurality outputs forming a correlation curve, a leading edge component that receives outputs, compares the outputs with a threshold, and generates a signal if it detects a potential leading edge the correlation curve, and a trailing edge component that upon receipt the signal from the confirmation component compares additional outputs to the threshold to locate the trailing edge the correlation curve.

In another aspect, a timing estimation system comprises means for receiving a stream signals at least a portion which are associated with a pilot symbol, means for generating correlation outputs from the signals and delayed copies thereof, and means for detecting a leading edge and a trailing edge from the correlation outputs.

In yet another aspect, a microprocessor that executes instructions for performing a method timing estimation comprises generating correlation metrics from signal samples and delayed copies thereof, and detecting a leading edge and a trailing edge by comparing the metrics to a threshold.

In yet another aspect, a system timing estimation comprises a first component that receives a plurality data packets comprising at least a pilot symbol, a second component that generates correlation metrics from the data packets, a third component that analyzes the metrics overtime to determine whether a pilot symbol has been received, the pilot symbol is received upon detection metric values consistently less than a threshold for a first number times, followed by a metric values greater than or equal to the threshold for a second number times, followed by metric values consistently less than the threshold for a third number times.

To the accomplishment the foregoing and related ends, certain illustrative aspects and embodiments are described herein in connection with the following description and the annexed drawings.

BRIEF DESCRIPTION OF THE DRAWINGS

The foregoing and other aspects will become apparent from the following detailed description and the appended drawings described in brief hereinafter.

FIG. 1 is a block diagram coarse frame detection system.

FIG. 2a is graph a correlation curve in an ideal single path environment.

FIG. 2b is a graph a correlation curve in a real multipath environment.

FIG. 13 is a schematic block diagram a suitable operating environment for various aspects and embodiments.

FIG. 14 is a diagram an embodiment a super-frame structure for use in an OFDM system.

FIG. 15a is diagram an embodiment a TDM pilot-1.

FIG. 15b is diagram an embodiment a TDM pilot-2.

FIG. 18a is a diagram a time-domain representation TDM pilot-1.

FIG. 18b is a diagram a time-domain representation TDM pilot-2.

FIG. 21a is a timing diagram the processing for a TDM pilot-2 OFDM symbol.

FIG. 21b is a timing diagram an $L_2$-tap channel impulse response from IDFT unit.

FIG. 21c is a plot the energy channel taps at different window starting positions.

DETAILED DESCRIPTION

Figure 3:
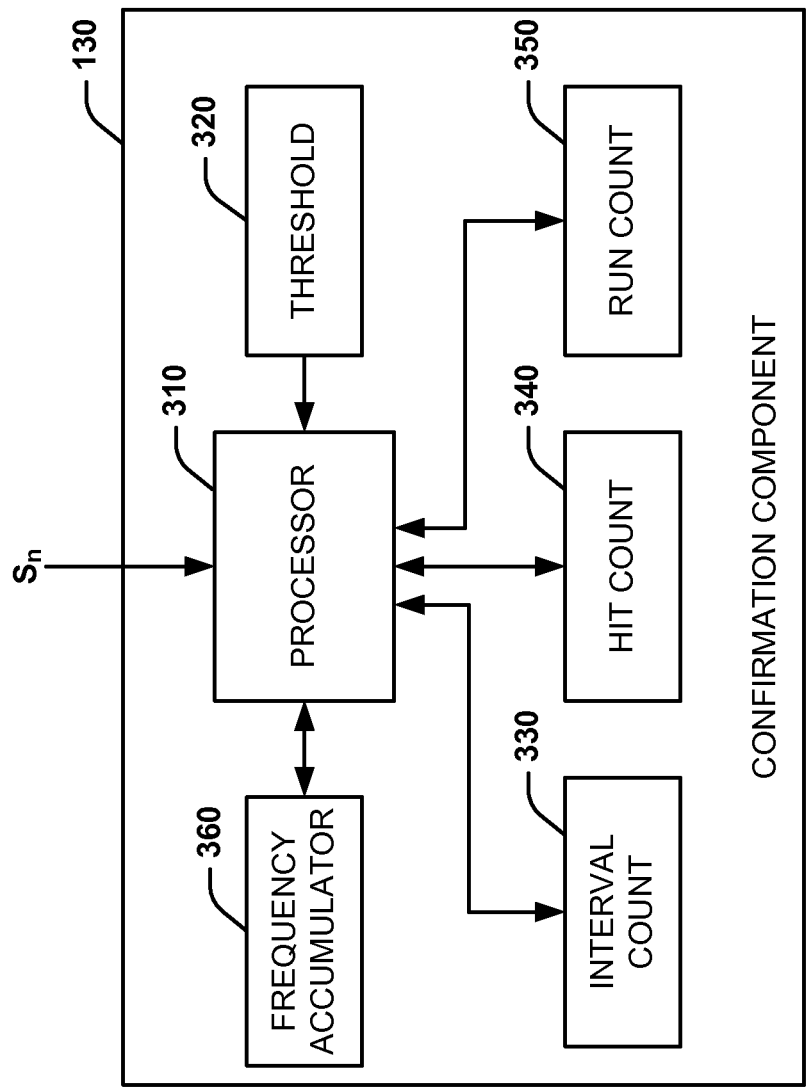
FIG. 3 is a block diagram an embodiment a confirmation component.

Various aspects and embodiments are now described with reference to the annexed drawings, wherein like numerals refer to like or corresponding elements throughout. It should be understood, however, that the drawings and detailed description thereto are not intended to limit embodiments to the particular forms disclosed. Rather, the intention is to cover all modifications, equivalents, and alternatives.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread execution, a program, and/or a computer (e.g. desktop, portable, mini, palm . . . ). By way illustration, both an application running on a computer device and the device itself can be a component. One or more components may reside within a process and/or thread execution and a component may be localized on one computer and/or distributed between two or more computers.

Furthermore, aspects may be implemented as a method, apparatus, or article manufacture using standard programming and/or engineering techniques to produce software, firmware, hardware, or any combination thereto control a computer to implement the disclosed aspects. The term "article manufacture" (or alternatively, "computer program product") as used herein is intended to encompass a computer program accessible from any computer-readable device, carrier, or media. For example, computer readable media can include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN).

In accordance with the corresponding disclosure, various aspects are described in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Turning initially to FIG. 1, frame detection system 100 is depicted. More specifically, system 100 is a receiver side sub-system associated with synchronization of wireless symbol transmissions (e.g., OFDM symbols). Synchronization refers generally to the process performed by a receiver to obtain both frame and symbol timing. As will be described in more detail in the sections that follow, frame detection is based on identification pilot or training symbols transmitted at the start a frame or super-frame. In one embodiment, the pilot symbols are time division multiplexed (TDM) pilots. In particular, a first pilot symbol can be employed for coarse estimation a frame at a symbol boundary, inter alia, while a second pilot symbol can be utilized for to improve such estimation. System 100 is primarily concerned with detection the first pilot symbol for frame detection, although it can be utilized in conjunction with the detection other training symbols. System 100 includes delayed correlator component 110, leading edge detection component 120, confirmation component 130, and trailing edge detection component 130.

The delayed correlator component 110 receives a stream digital input signals from a wireless device receiver (not shown). The delayed correlator component 110 processes the input signals and produces detection metrics or correlation outputs ($S_n$) associated therewith. A detection metric or correlation output is indicative the energy associated with one pilot sequence. The computation mechanisms that generate detection metrics from streams input signals will be presented in detail infra. Detection metrics are provided to a leading edge component 120, a confirmation component 130, and a trailing edge component 140 for further processing.

Turning briefly to FIGS. 2a and 2b, two exemplary diagrams illustrating pilot correlation outputs are provided for purposes clarity as well as to facilitate appreciation one the problems identified and overcome. The correlation diagrams depict a correlator output as captured by the magnitude the detection metric over time. FIG. 2a depicts correlator output in a channel without noise. The correlator output clearly has a leading edge, a flat portion, and subsequently a trailing edge. FIG. 2b illustrates an exemplary correlation curve in a channel subject to multipath effects (e.g., noise is resident upon the channel). One can observe that a pilot is existent, however it is obscured by channel noise and multipath delay. Conventionally, a single threshold is employed to detect a pilot symbol. In particular, the threshold is used to determine the start a symbol when the correlation values are greater than the set or predetermined threshold. In the ideal case FIG. 2a, the threshold would be set close to the flat zone value and a symbol would be detected when it crosses that value. Subsequently, a count would be initiated to determine the trailing edge. Alternatively, the trailing edge could simply be detected when the curve values dip below the threshold. Unfortunately, such conventional methods and techniques are not effective in a real multipath environment. As can be ascertained from FIG. 2b, the leading edge cannot readily be determined from the correlation values as multipath effects can cause the values to be spread and noise can further obscure the leading edge. This can result in a large number false positive detections. Furthermore, the spreading the signal is not conducive to counting samples to detect a trailing edge and noise will prohibit detection a trailing edge when values dip below the threshold. The techniques disclosed herein provide a robust system and method pilot and frame detection that is effective at least in a real world multipath environment.

Turning back to FIG. 1, leading edge component 120 can be employed to detect a potential leading edge a correlation curve (e.g. where the correlation curve represents an energy distribution over time). Leading edge component 120 receives a series detection metric values ($S_n$) from the delayed correlator component 120. Upon receipt, the value is compared to a fixed or programmable threshold (T). In particular, a determination is made as to whether $S_n \geq T$. If it is, then a count or counter (e.g., run count) is incremented. Alternatively, if $S_n < T$ then the counter can be set to zero. The counter thereby stores the number consecutive correlation output values that are above the threshold. Leading edge component 120 monitors this counter to ensure that a predetermined or programmed number samples have been analyzed. According to an embodiment, this can correspond to when the run count=64. However, it should be appreciated that this value can be modified to optimize detection in a particular system in a specific environment. This technique is advantageous in that it makes it less likely that a leading edge will be falsely detected as a result initial noise or spreading, because the samples must consecutively stay above a threshold for a length time. Once the condition(s) are satisfied, the leading edge component can declare detection of a potential leading edge. Subsequently, a signal can be provided to confirmation component 130 indicating such.

As the name suggests, confirmation component 130 is operable to confirm that a leading edge was indeed detected by the leading edge component 120. Following a leading edge, a lengthy flat period is expected. Hence, if the flat portion is detected then this increases the confidence that the leading edge the pilot symbol was detected by the leading edge component 120. If not, then a new leading edge will need to be detected. Upon receipt a signal from the leading edge component 120, the confirmation component 130 can begin to receive and analyze additional detection metric values ($S_n$).

Turning to FIG. 3, a block diagram one exemplary implementation the confirmation component 130 is depicted to facilitate clarity in understanding. Confirmation component 130 can include or be associated with a processor 310, a threshold value 320, an interval count 330, a hit count 340, a run count 350, and a frequency accumulator 360. Processor 310 is communicatively coupled with threshold 320, interval counter 330, hit counter 340, run counter 350, and the frequency accumulator 360. Furthermore, processor 310 is operable to receive and/or retrieve correlation values $S_n$ as well as interact (e.g., receive and transmit signals) with leading edge component 120 (FIG. 1) and trailing edge component 140 (FIG. 1). The threshold value 320 can be the same threshold as was employed by the leading edge component 120 (FIG. 1). Furthermore, it should be noted that while the threshold value is illustrated as part the confirmation component 130 as a hard coded value, for instance, the threshold value 320 can be received and/or retrieved from outside the component to, among other things, facilitate programming such value. In brief, interval count 330 can be used in determining when to update a frequency locked loop to determine frequency offset employing frequency accumulator 360 as well as detecting the trailing edge. Hit count 340 can be utilized to detect the symbol flat zone and run count 350 is used to identify a trailing edge.

Prior to initial processing correlation values, the processor 310 can initialize each of the counters 330, 340, and 350, as well as the frequency accumulator 360 to zero, for example. The processor 310 can then receive or retrieve a correlation output $S_n$ and the threshold 320. The interval count 330 can then be incremented to note that a new sample has been retrieved. Each time a new correlation sample is retrieved the interval count 330 can be incremented. The processor 310 can subsequently compare the correlation value to threshold 320. If $S_n$ is greater than or equal to the threshold, then the hit count can be incremented. As per the run count, it can be incremented if $S_n$ is less then the threshold 320, otherwise it is set to zero. Similar to the leading edge, run count thus can indicate the number consecutive samples below threshold. The count values can be analyzed to determine whether a leading edge has been detected, there was a false positive, or the leading edge was otherwise missed (e.g., got in to late), among other things.

In one embodiment, the confirmation component 130 can determine that the leading edge component 120 detected a false leading edge by examining the run count and the hit count. Since the confirmation component should be detecting a flat zone of the correlation curve where the values are greater than or equal to the threshold, if the hit count is sufficiently low and the run count is greater than a set value or the hit count and the run count are substantially equal, then it can be determined that noise may have caused incorrect detection a leading edge. In particular, it can be noted that the received correlation values are not consistent with what is expected. According to one embodiment, the determination that a false leading edge can be made when the run count is greater than or equal to 128 and the hit count is less than 400.

A determination can be made by the confirmation component 130 that the leading edge was missed or otherwise detected too late for proper timing by again comparing the values the run count and the hit count. In particular, if the hit count and the run count are sufficiently large such a determination can be made. In one embodiment, this can be decided when the run count is greater than or equal to 786 and the hit count is greater than or equal to 400. Of course, and as with all specific values provided herein, the values can be optimized or adjusted for a particular frame structure and/or environment.

It should be appreciated that the confirmation component 130 can begin to detect the trailing edge the curve while it is analyzing the flat zone to decide if a proper leading edge was detected. If the trailing edge is detected, the confirmation component can be successfully terminated. To detect the trailing edge, the interval count and the run count can be employed. As noted above, the interval count includes the number input samples received and correlated. The length the flat zone is known to be within a particular count. Hence, if after detecting a potential leading edge and receiving a proper number flat zone samples there is some evidence a trailing edge, then the confirmation component can declare detection the trailing edge. The evidence a trailing edge can be provided by the run count, which counts the number consecutive times the correlation value is below the threshold. In one embodiment the confirmation component 130 can declare detection the trailing edge when the interval count is greater than or equal to 34*128 (4352) and the run count is greater than zero.

If the confirmation component fails to detect any one the above three conditions then it can simply continue to receive correlation values and update the counters. If one the conditions is detected, the processor can provide one or more additional checks on the counters to increase the confidence that one the conditions has actually occurred. In particular, the processor 310 can insist upon a minimum number hits in the flat zone as that is what it expected to observe after the leading edge detection. For instance, the processor can test whether the hit count is greater than a set value such as 2000. According to one embodiment a frame structure disclosed herein, the expected number hits in the flat zone should be 34*128, which over 4,000. However, noise will temper the actual results so the gating value can be set somewhat below 4,000. If the additional conditions are met, the confirmation component 130 can provide a signal to the trailing edge component alternatively the confirmation component can signal the leading edge component to locate a new leading edge.

It should also be appreciated that the confirmation component 130 can also provide additional functionality such as saving time instances and updating frequencies. The subject frame detection system 100 FIG. 1 is providing course detection the frame and symbol boundaries. Accordingly, some fine-tuning will need to be performed at a later time to get more precise synchronization. Therefore, at least one time reference should be saved for use later by a fine timing system and/or method. According to one embodiment, every time the run count is equal to zero, a time instance can be saved as an estimate the last time for the correlation curve flat zone or the time just prior to detecting the trailing edge. Furthermore, proper synchronization necessitates locking on the appropriate frequency. Hence, the processor 310 can update a frequency locked loop utilizing the frequency accumulator 360 at particular times such as when the input is periodic. According to one embodiment, the frequency locked loop can be updated every 128 input samples as tracked by the interval counter, for instance.

Returning to FIG. 1, trailing edge component 140 can be employed to detect the trailing edge if not detected by the confirmation component 130. In sum, trailing edge component 140 is operable to detect the trailing edge or simply time out such that another leading edge can be detected by leading edge component 120.

Figure 4:
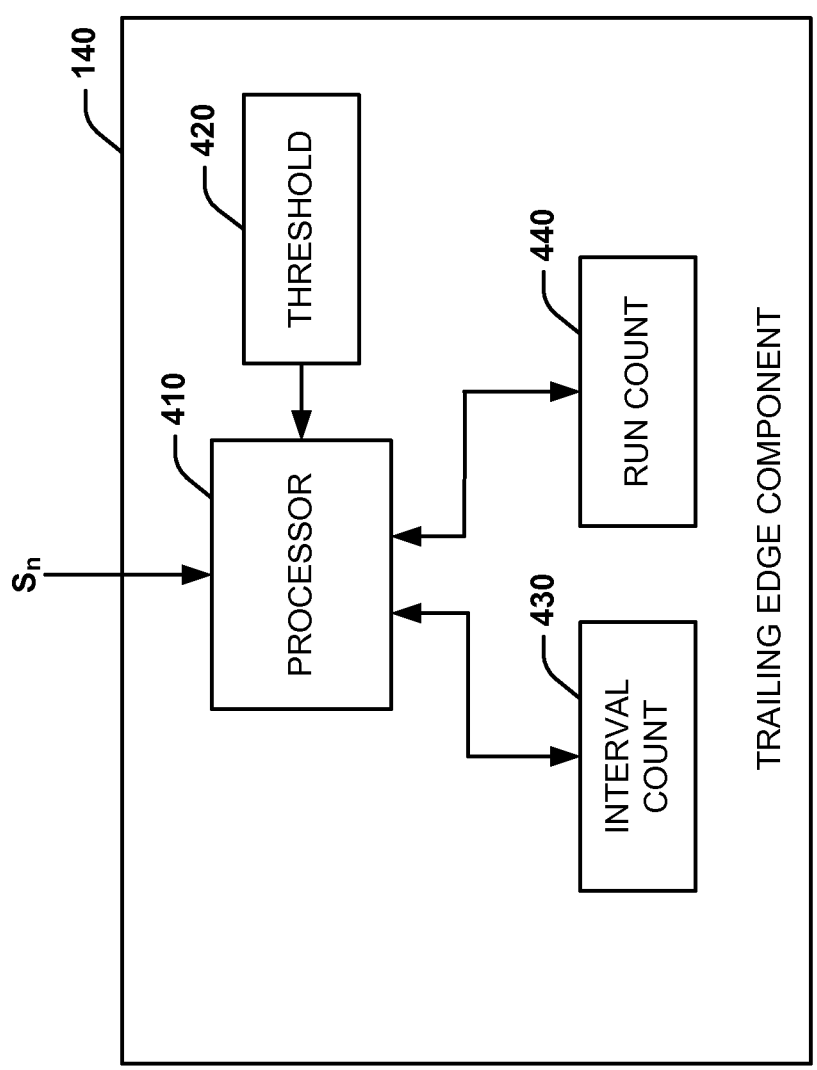
FIG. 4 is a block diagram an embodiment a trailing edge component.

Turning to FIG. 4 an embodiment a trailing edge component 140 is illustrated. The trailing edge component 140 can include or be associated with processor 410, a threshold 420, an interval count 430 and a run count 440. Similar to the other detection components, trailing edge component 140 can receive a plurality of correlation values from the delayed correlator component 110 and increment appropriate counts to facilitate detection a correlation curve trailing edge associated with a first pilot symbol (e.g., a TDM pilot symbol). In particular, processor 410 can compare the correlation value with the threshold 420 and populate either or both the interval count 430 and the run count 440. It should be noted that although the threshold 420 is illustrated as part the trailing edge component it could also be received or retrieved from outside the component such as from a central programmatic location. It should also be appreciated course that processor 410 can, prior to its first comparison, initialize the interval count 430 and a run count 440 to zero. The interval count 430 stores the number correlation outputs received. Thus, with each received or retrieved correlation value, the processor 410 can increment the interval count 430. The run count stores the consecutive number times the correlation value or output is less than the threshold 420. If the correlation value is less than a threshold then the processor 410 can increment the run count 440, otherwise run count 440 can be set to zero. The trailing edge component 140 by way processor 410, for example, can test whether an interval count value or a run count value has been satisfied utilizing the interval count 430 and or the run count 440. For instance, if the run count 440 attains a certain value the trailing edge component can declare detection a trailing edge. If not, the trailing edge component 140 can continue to receive correlation values and update the counts. If, however, the interval count 430 becomes sufficiently large this can indicate that the trailing edge will not be detected and a new leading edge needs to be located. In one embodiment, this value can be 8*128 (1024). On the other hand, if the run count 440 hits or exceeds a value this can indicate that a trailing edge has been detected. According to an embodiment, this value can be 32.

Additionally, it should be appreciated that trailing edge component 140 can also save time instances for use in acquisition fine timing. According to an embodiment, the trailing edge component 140 can save the time instance whenever the run count equals zero thereby providing a time instance just prior to trailing edge detection. According to one embodiment and the frame structure described infra, the saved time instance can correspond to the 256$^{th}$ sample in the next OFDM symbol (TDM pilot-2). A fine frame detection system can subsequently improve upon that value as discussed in later sections.

Figure 5:
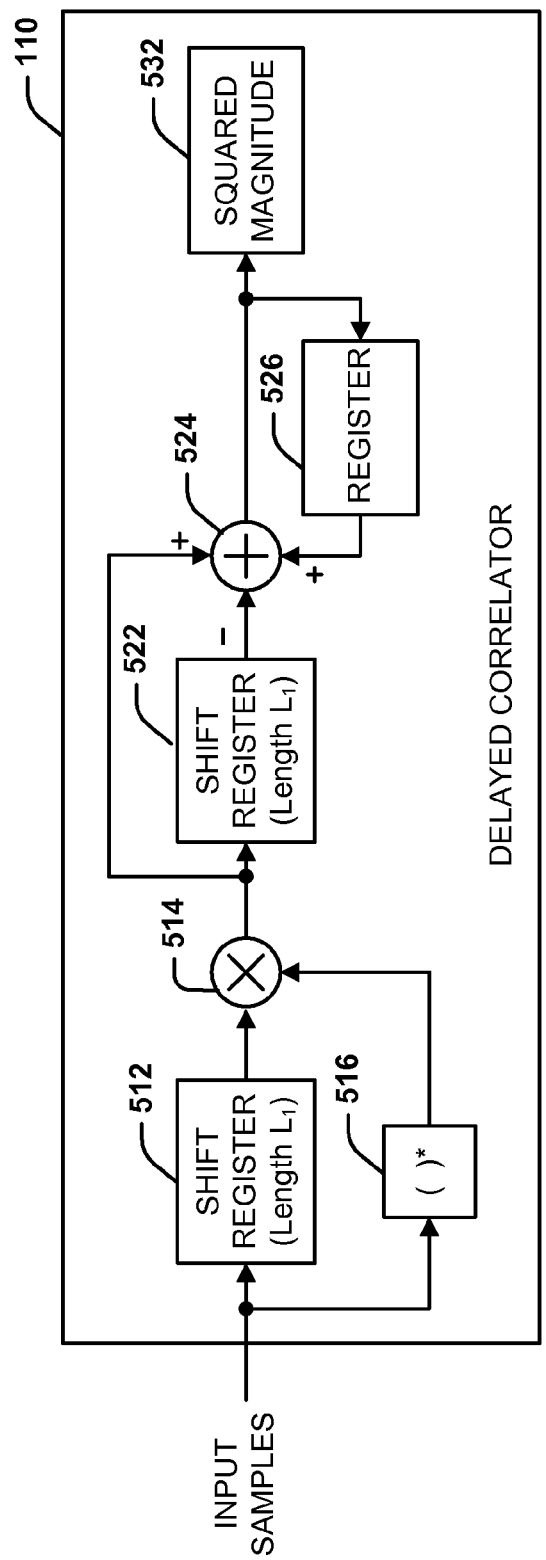
FIG. 5 is a block diagram an embodiment a delayed correlator component.

FIG. 5 illustrates a delayed correlator component 110 in further detail in accordance with one embodiment. The delayed correlator component 110 exploits the periodic nature the pilot-1 OFDM symbol for frame detection. In an embodiment, correlator 110 uses the following detection metric to facilitate frame detection:

$$S_n = \left| \sum_{i=n-L_1+1}^{n} r_{i-L_1} \cdot r_i^* \right|^2,$$ Eq (1)

where $S_n$ is the detection metric for sample period n;
"*" denotes a complex conjugate; and
$|x|^2$ denotes the squared magnitude x.
Equation (1) computes a delayed correlation between two input samples $r_i$ and $r_{i-L_1}$ in two consecutive pilot-1 sequences, or $c_i = r_{i-L_1} \cdot r_i^*$. This delayed correlation removes the effect the communication channel without requiring a channel gain estimate and further coherently combines the energy received by way the communication channel. Equation (1) then accumulates the correlation results for all $L_1$ samples a pilot-1 sequence to obtain an accumulated correlation result $C_n$, which is a complex value. Equation (1) then derives the decision metric or correlation output $S_n$ for sample period n as the squared magnitude $C_n$. The decision metric $S_n$ is indicative the energy of one received pilot-1 sequence length $L_1$, if there is a match between the two sequences used for the delayed correlation.

Within delayed correlator component 110, a shift register 512 (length $L_1$) receives, stores, and shifts the input samples $\{r_n\}$ and provides input samples $\{r_{n-L_1}\}$ that have been delayed by $L_1$ sample periods. A sample buffer may also be used in place shift register 512. A unit 516 also receives the input samples and provides the complex-conjugated input samples $\{r_n^*\}$ For each sample period n, a multiplier 514 multiplies the delayed input sample $r_{n-L_1}$ from shift register 512 with the complex-conjugated input sample $r_n^*$ from unit 516 and provides a correlation result $c_n$ to a shift register 522 (length $L_1$) and a summer 524. Lower-case $c_n$ denotes the correlation result for one input sample, and upper-case $C_n$ denotes the accumulated correlation result for $L_1$ input samples. Shift register 522 receives, stores, and delays the correlation results $\{c_n\}$ from multiplier 514 and provides correlation results $\{c_{n-L_1}\}$ that have been delayed by $L_1$ sample periods. For each sample period n, summer 524 receives and sums the output $C_{n-1}$ a register 526 with the result $c_n$ from multiplier 514, further subtracts the delayed result $c_{n-L_1}$ from shift register 522, and provides its output $C_n$ to register 526. Summer 524 and register 526 form an accumulator that performs the summation operation in equation (1). Shift register 522 and summer 524 are also configured to perform a running or sliding summation the $L_1$ most recent correlation results $c_n$ through $c_{n-L_1+1}$. This is achieved by summing the most recent correlation result $c_n$ from multiplier 514 and subtracting out the correlation result $c_{n-L_1}$ from $L_1$ sample periods earlier, which is provided by shift register 522. A unit 532 computes the squared magnitude the accumulated output $C_n$ from summer 524 and provides the detection metric $S_n$.

Figure 6:
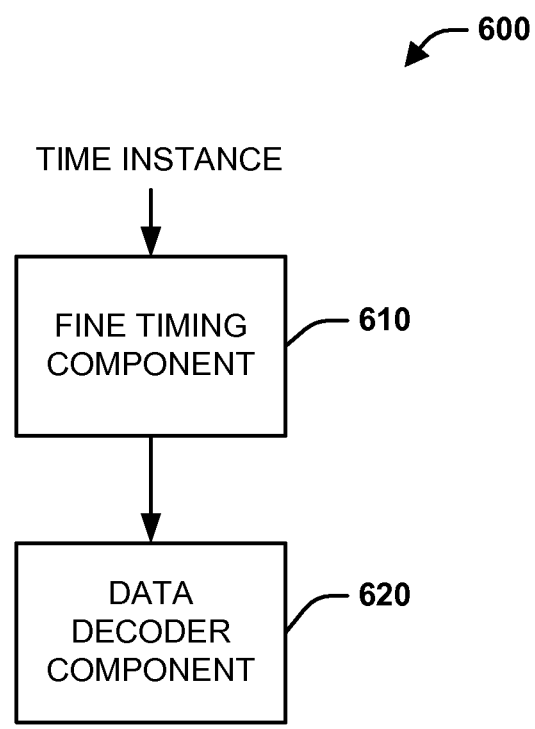
FIG. 6 is a block diagram an embodiment a fine frame detection system.

FIG. 6 depicts a fine frame detection system 600. System 600 includes a fine timing component 610 and a data decoder component 620. Fine timing component 610 can receive the time instance saved by the coarse frame detection system 100 (FIG. 1). As mentioned above, this time instance can correspond to the 256$^{th}$ sample the next OFDM symbol, which can be TDM pilot-2. This is somewhat arbitrary yet optimized for channels subject to multipath effects. The fine timing component 610 can then utilize the TDM pilot-2 symbol to improve upon this coarse timing estimate ($T_c$). There are many mechanisms to facilitate fine timing including those known in the art. According to one embodiment herein, a frequency-locked loop or automatic frequency control loop can be switched from acquisition to tracking mode, which utilizes a different algorithm to compute error and a different tracking loop bandwidth. Data decoder component 620 can attempt to decode one or more data OFDM symbols. This is an extra step providing for additional confidence that the synchronization has been accomplished. If the data does not decode, a new leading edge will have to be detected again by the leading edge component 120 (FIG. 1). Further detail concerning fine timing is provided infra.

In view the exemplary systems described supra, methodologies that may be implemented will be better appreciated with reference to the flow charts FIGS. 7-12. While for purposes simplicity explanation, the methodologies are shown and described as a series blocks, it is to be understood and appreciated that the subject methodologies are not limited by the order the blocks, as some blocks may occur in different orders and/or concurrently with other blocks from what is depicted and described herein. Moreover, not all illustrated blocks may be required to implement the provided methodologies.

Additionally, it should be further appreciated that the methodologies disclosed hereinafter and throughout this specification are capable being stored on an article manufacture to facilitate transporting and transferring such methodologies to computer devices. The term article manufacture, as used, is intended to encompass a computer program accessible from any computer-readable device, carrier, or media.

Figure 7:
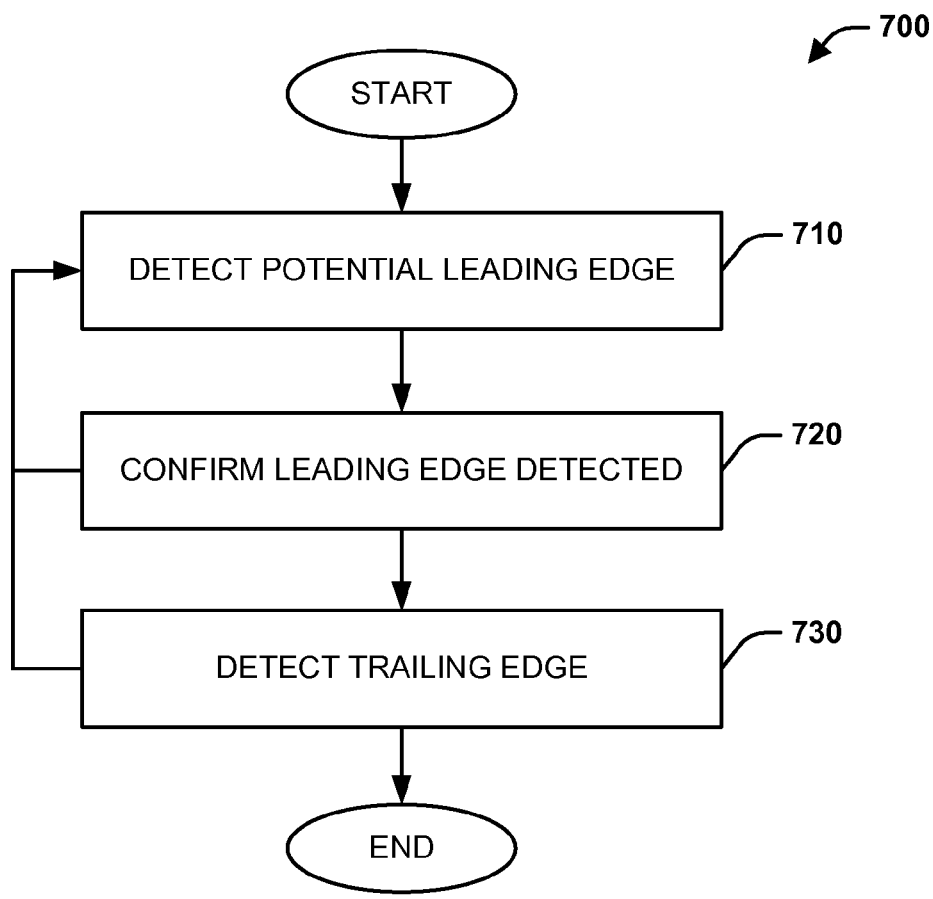
FIG. 7 is a flow chart diagram an initial coarse frame detection methodology.

Turning to FIG. 7, a robust method initial frame detection is illustrated. The method essentially contains three stages. At 710, the first stage, an attempt is made to observe a pilot symbol leading edge. The leading edge can be detected by analyzing a plurality detection metrics or correlation output values produced by a delayed correlator. In particular, the detection metrics ($S_n$) or some function there (e.g. $S_n^2$...) can be compared with a threshold value. Potential detection the leading edge can then be predicated on the number times the metric is greater than or equal to the threshold. At 720, the detected leading edge is confirmed by observing additional correlation values and comparing them to the threshold. Here, the correlator output is again compared to the threshold and observations made regarding the number times the correlator output exceeds the threshold. The process can stay in this stage for greater than or equal to a predetermined period time (corresponding to the flat zone) or upon detection a consistent trailing edge. It should also be noted that frequency offset can be obtained here be updating a frequency accumulator periodically. If neither the confirmation conditions is met, then there was a false detection a leading edge and the procedure can be initialized and started again at 710. At 730, an attempt is made to observe the trailing edge if not previously observed. If the correlator output remains below the threshold for a number consecutive samples, for example 32, TDM pilot detection can be declared and initial frequency acquisition assumed to be complete. If this condition is not met then the process can be initialized and started again at 710. The initial OFDM symbol time estimate is based on the trailing edge. The time instance when the correlator output goes below the threshold for the first time during observation the trailing edge can be views as an index (e.g., $256^{th}$ sample) into the next OFDM symbol, here, for example, TDM pilot-2.

Figure 8:
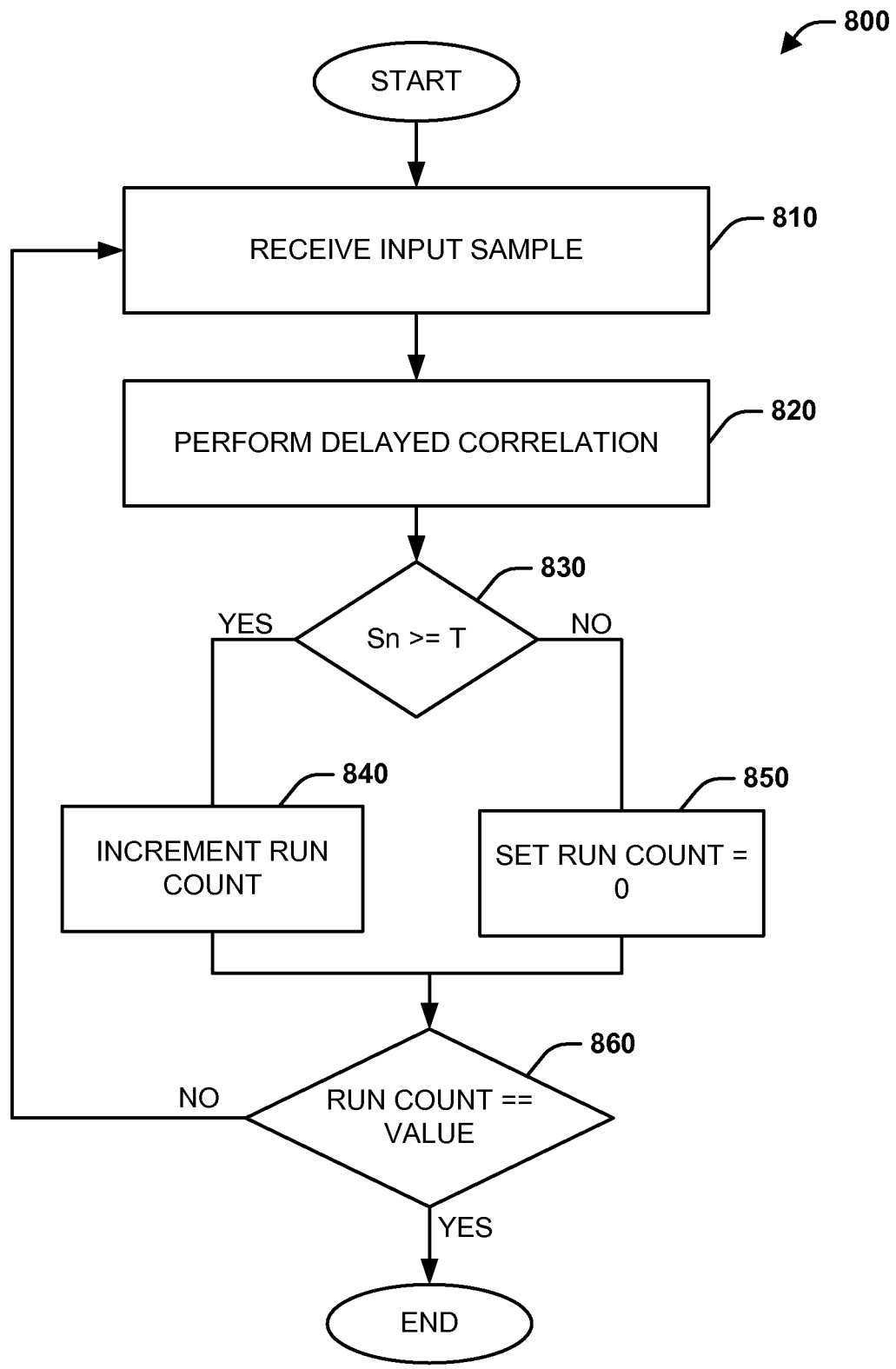
FIG. 8 is a flow chart diagram a leading edge detection methodology.

FIG. 8 is a flow chart diagram depicting a leading edge detection methodology 800. At 810, transmitted input samples are received. A delayed correlation is performed, at 820, on the received input and a delayed version thereA correlation output is then provided to decision block 830. At 830, the correlation output is compared with a fixed or programmable threshold value. If the correlation value is greater than or equal to the threshold a run count or counter is incremented at 840. If the correlation value is less then the threshold value then the run count is set to zero, at 850. The run count is then compared, at 860, with a predetermined value that is optimized for detection a leading edge in a multipath environment. In one embodiment, the value can be 64 input samples. If the run count is equal to the predetermined value the process is terminated. If the run count is not equal to the value then the additional input values are received at 810 and the process in repeated.

Figure 9:
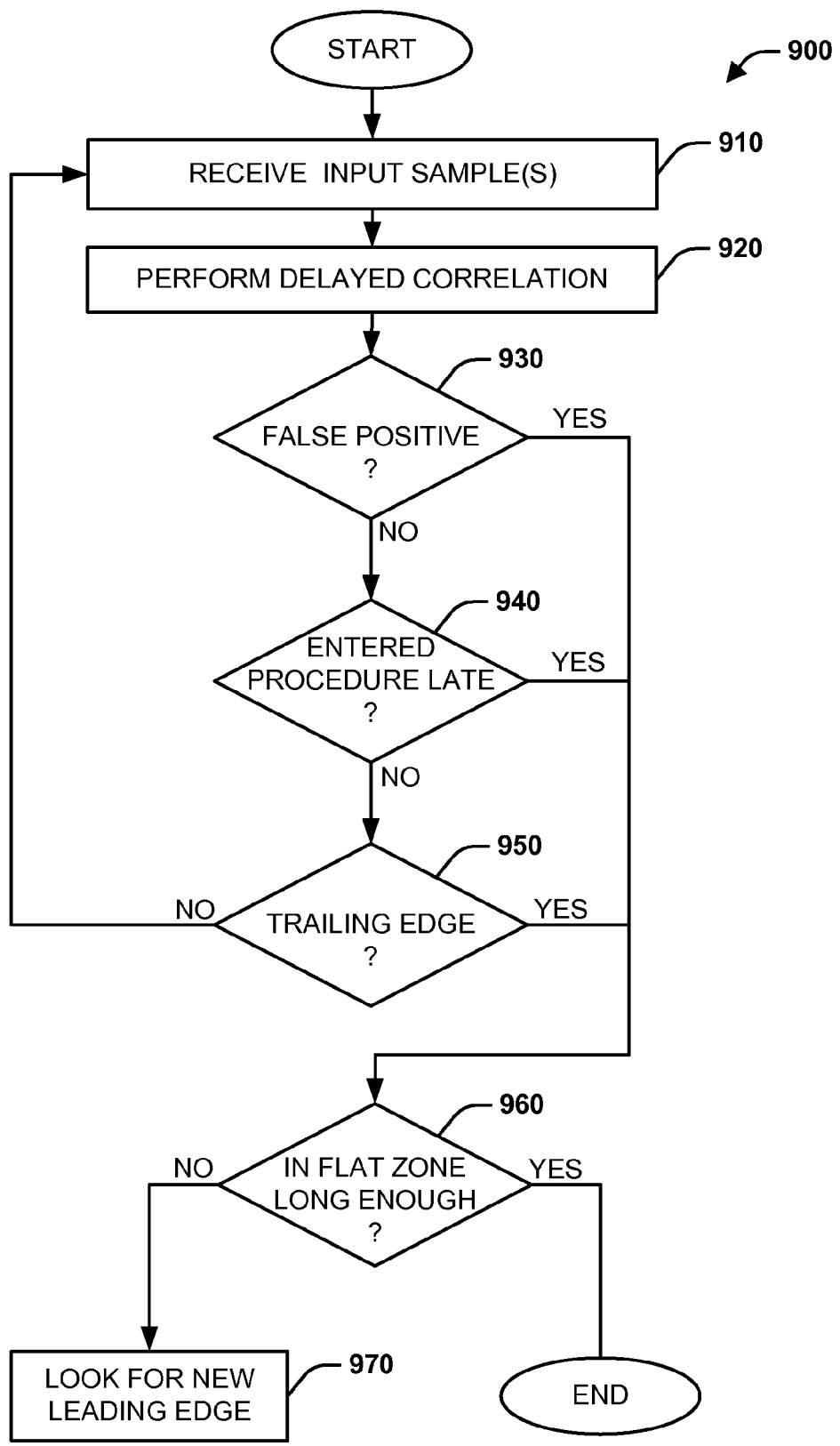
FIG. 9 is a flow chart diagram a leading edge confirmation and flat zone detection methodology.

FIG. 9 is a flow chart diagram leading edge confirmation methodology 900. Methodology 900 represents the second stage in a coarse or initial frame detection methodology, in which a leading edge detection is confirmed (or rejected) by way detection additional expected results, namely a flat zone and/or a trailing edge. At 910, one a myriad input samples is received. A delayed correlation is performed on the input sample and a delayed version thereof, at 920, to produce a correlation output. A plurality correlator outputs are then analyzed with respect to a programmable threshold to make subsequent determinations. At 930, a determination is made as to whether a false leading edge was detected, which can result from channel noise, among other things. This determination can be made if not enough correlation output values are above a threshold. At 940, a determination is made as to whether a leading edge was detected too late. In other words, the leading edge was not detected until well into the flat zone region the pilot. At 950, a determination is made as to whether a trailing edge is being observed. If none these conditions are true based on the correlation outputs received thus far, the process continues at 910 where more input samples are received. If any one the conditions is true, the process can continue at 960, were an additional determination is made concerning whether a long enough flat zone has been observed to provide confidence that it was detected. If yes, the procedure can be terminated. If no, the process can proceed with another method, such as method 800 (FIG. 8), to detect a new leading edge 970. In one embodiment, a new pilot symbol will be transmitted one second after the previous pilot symbol.

Figure 10A:
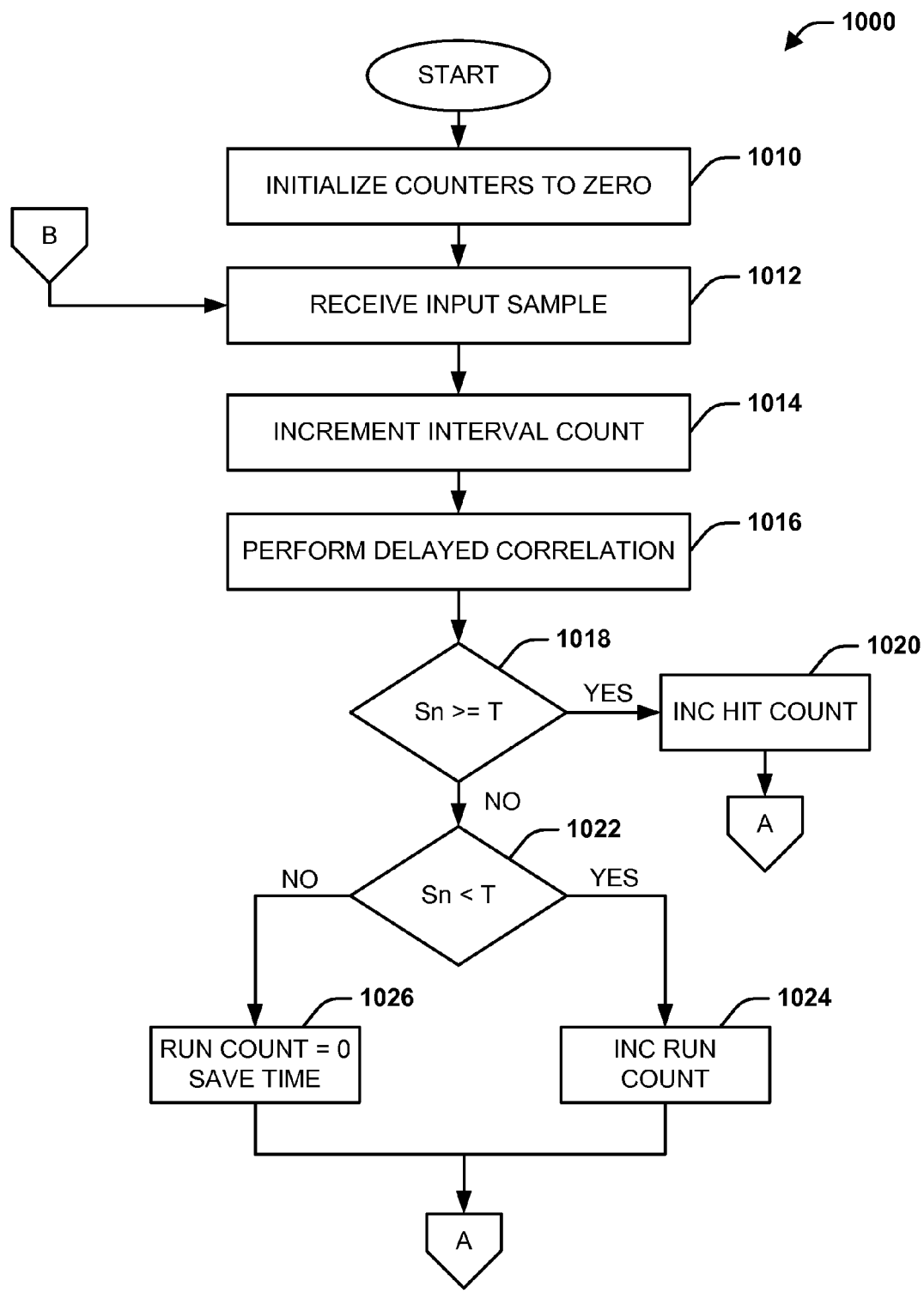
FIG. 10a is a flow chart diagram a leading edge confirmation and flat zone detection methodology.
Figure 10B:
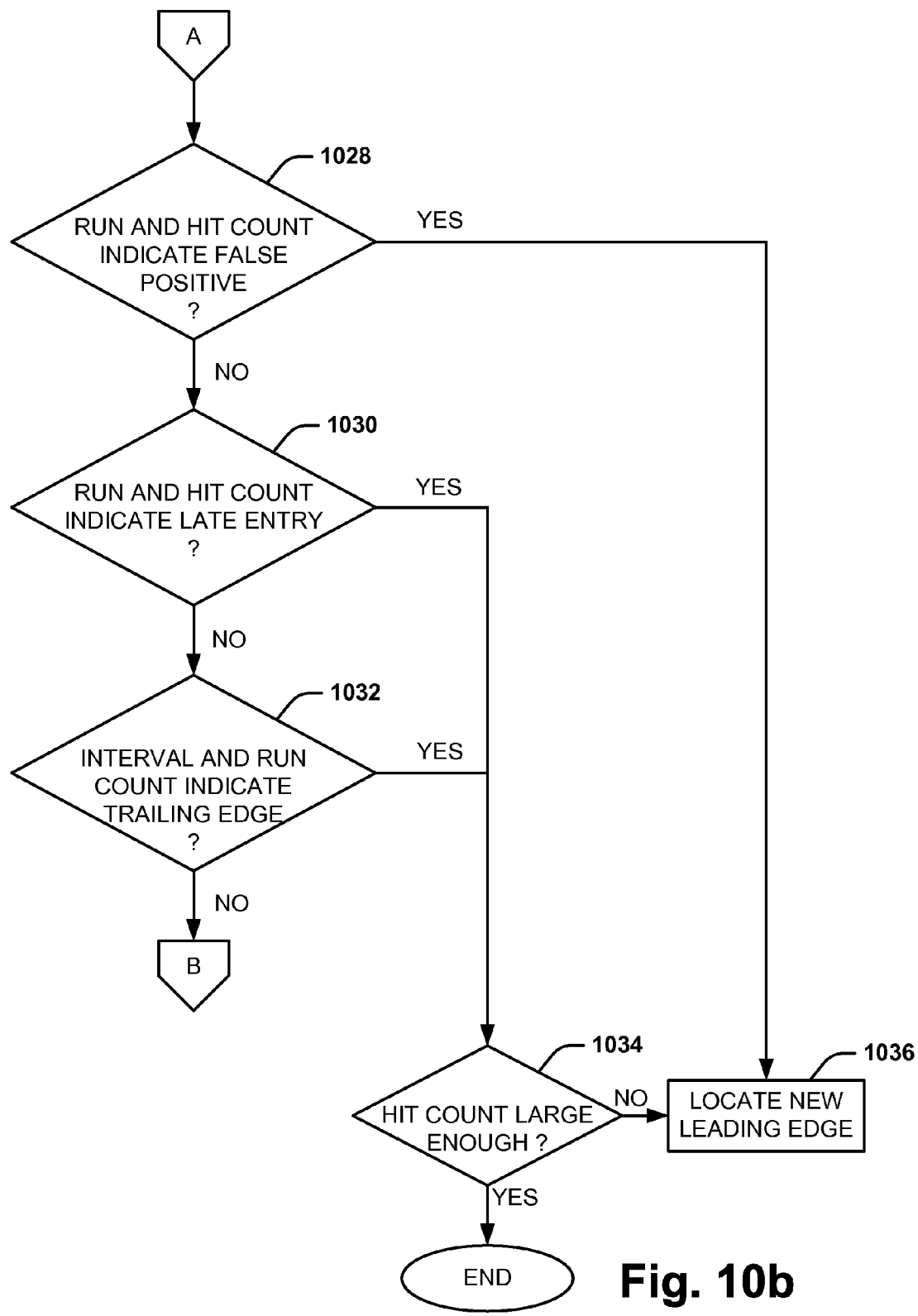
FIG. 10b is a flow chart diagram a leading edge confirmation and flat zone detection methodology.

FIG. 10 depicts a more detailed method 1000 detecting the flat zone and confirming detection the leading edge in accordance with a particular embodiment. In this particular process, three counts or counters are employed: an interval count, a hit count, and a run count. At 1010, counters are all initialized to zero. At 1012, input samples are received. The interval count is incremented, at 1014, to indicate receipt an input sample. It should also be appreciate that although not specifically denoted in the block diagram, a frequency loop can be updated every 128 samples as tracked by the interval count. At 1016, delayed correlation is performed utilizing the input sample and a time-delayed version thereto produce a correlation output ($S_n$). A determination is then made, at 1018, as to whether $S_n$ is greater than or equal to a threshold (T). If $S_n >= T$, then the hit count is incremented at 1020 and the method can proceed at 1028. If not, then a determination is made at 1022 as to whether $S_n < T$. If yes, then the run count is incremented at 1024. If no, then the run count is initialized to zero and the time is saved 1026. The saved time therefore provides the time instance prior to observation a trailing edge. It should be appreciated that decision block 1022 is not strictly necessary here but is provided for clarity as well as to highlight further that the order such method processes does not need to be fixed as shown. The method continues to 1028 where the hit count and the run count are scrutinized to determine if a false leading edge was detected. In one embodiment, this can correspond to the run count being greater than or equal to 128 and the hit count being less than 400. If it is decided that a false positive was detected the process proceeds to 1036 where a new leading edge is located. If a false positive was not able to be determined then the process continues at decision block 1030. At 1030, the run count and the hit count are analyzed to determine if the leading edge was detected late. According to one specific embodiment, this can correspond to when the run count is greater than or equal to 768 and the hit count is greater than or equal to 400. If this is the case, the process can continue at 1034. If the leading edge was not detected late, then the process proceeds to 1032 where the interval count and the run count are analyzed to determine if a trailing edge is being observed. In one embodiment this can be where the interval count is greater than or equal to the 4352 (34*128) and the run count is greater than zero. In other words, the full length the flat zone has been detected and a dip below threshold has just been observed. If no, then all three conditions have failed and the process proceeds to 1012 where more input samples are received. If yes, a determination is made at 1034 as enough values have been observed above the threshold to enable the methodology to determine with confidence that the flat zone has been detected. More specifically, the hit count is larger than some programmable value. In one embodiment, the value can be 2000. However, this is somewhat arbitrary. Ideally, the process should see 34*128 (4352) samples above threshold, but noise can temper the count. Thus, the programmable value can set to an optimal level that provides a particular level confidence that the flat zone has been detected. If the hit count is greater than the provided value, then the process terminates. If not, the process proceeds to 1036 where a new edge needs to be detected.

Figure 11:
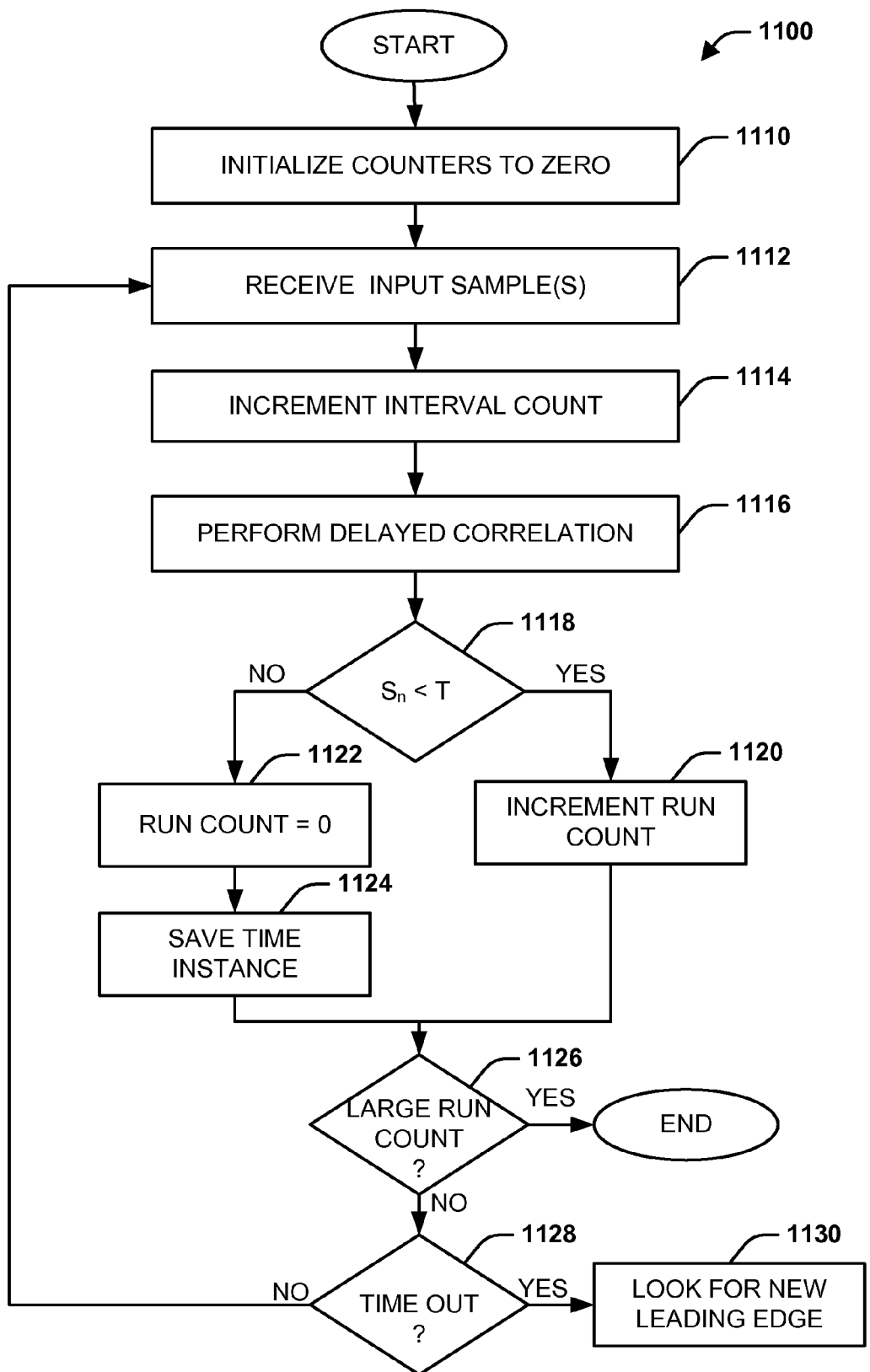
FIG. 11 is a flow chart diagram a trailing edge detection methodology.

FIG. 11 illustrates one embodiment a trailing edge detection methodology 1100. Trailing edge methodology can be employed to detect the trailing edge correlation curve associated with a pilot symbol, if not previously detected. At 1110, counters including an interval and a run counter are initialized to zero. At 1112, input samples are received. The interval count is incremented corresponding to a received sample, at 1114. Each input sample is utilized by a delayed correlator to produce a correlation output $S_n$, at 1116. A decision is made at 1118 regarding with the correlation output $S_n$ is less than a programmable threshold (T). If $S_n$<T, then the run count is incremented 1120 and the process proceeds to 1126. If the correlation output is not less than the threshold, then the run counter is set to zero at 1122 and the time instance can be saved at 1124. At 1126, a determination is made as to whether enough correlation outputs have been observed consecutively to confidently declare successful identification thereof. In one embodiment, this corresponds to a run time greater than or equal to 32. If the run time is large enough, the process can terminate successfully. If the run time is not large enough, the process proceeds to decision block 1128. At 1128, the interval counter can be employed to determine whether the detection method 1100 should be timed out. In one embodiment if the interval count is equal to 8*128 (1024) the trailing edge detection method 1100 times out. If the method does not timeout at 1128, then additional samples can be received and analyzed starting again at 1112. If the method does time out at 1128, then the new pilot leading edge will need to be detected 1130 as the method 1100 failed to observe a trailing edge.

Figure 12:
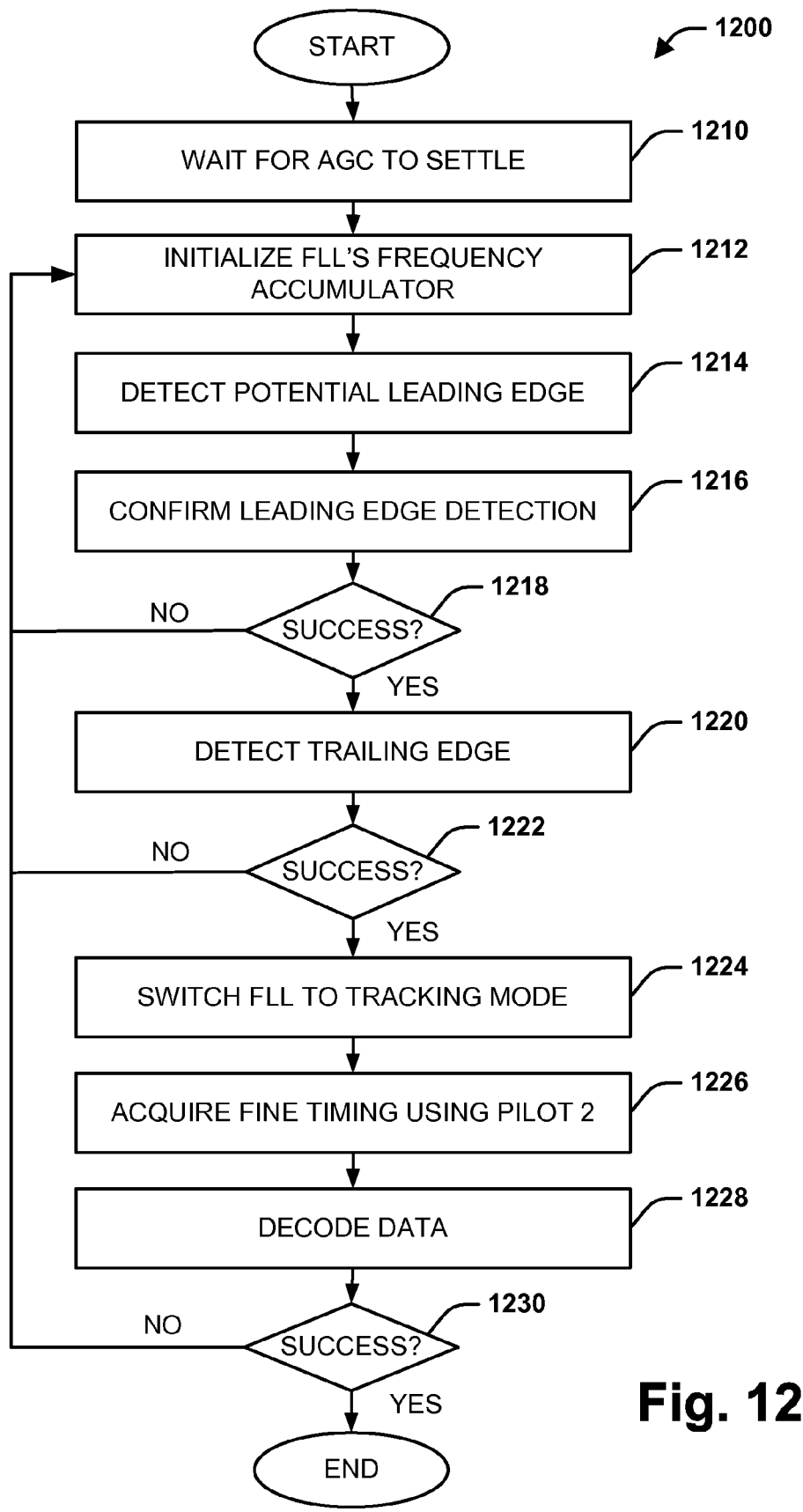
FIG. 12 is a flow chart diagram a frame synchronization methodology.

FIG. 12 illustrates a frame synchronization methodology 1200. At 1210, the process first waits for automatic gain control (AGC) to settle. Automatic gain control adjusts the input signal to provide a consistent signal strength or level such that the signal can be properly processed. At 1212, a frequency locked loop (FLL) accumulator is initialized. At 1214, a potential leading edge is detected. At 1216, the leading edge can be confirmed by detection a flat zone and/or a trailing edge. If it is determined that a valid leading edge was not detected at 1218, then the method returns to 1212. It should be appreciated also that it is at this point where the frequency locked loop can be updated periodically utilizing the frequency accumulator, for example to acquire the initial frequency offset. At 1212, the trailing edge can be detected if not previously observed. It is here just prior to the initial dip the trailing edge that the time can be saved to be used later for fine timing. If the trailing edge is not detected at 1222 and was not previously detected then the method returns to 1212. If the trailing edge was detected then the initial coarse detection has been completed. The procedure continues at 1224 where the frequency locked loop is switch to tracking mode. Fine timing is acquired utilizing a second TDM pilot symbol and information provided by the prior coarse estimate 1226. In particular, the time instance saved ($T_c$) can correspond to a particular sample offset within the second pilot symbol. In accordance with one embodiment, the saved time sample can correspond to the 256.sup.th sample in the second pilot symbol. Specific algorithms can them be utilized to improve upon that timing estimate as described in later sections. Upon termination fine timing acquisition, one or more data symbols can be retrieved and an attempt made to decode such symbols can be undertaken at 1228. If, at 1230, the decoding was successful then the process terminates. However, if the process was not successful then the methodology returns to 1212.

The following is a discussion one a plurality suitable operating environments to provide context for particular inventive aspects described supra. Further, in the interest clarity and understanding a detailed description is provided of one embodiment time division multiplexed pilots—TDM pilot-1 and TDM pilot-2.

The synchronization techniques described below and throughout may be used for various multi-carrier systems and for the downlink as well as the uplink. The downlink (or forward link) refers to the communication link from the base stations to the wireless devices, and the uplink (or reverse link) refers to the communication link from the wireless devices to the base stations. For clarity, these techniques are described below for the downlink in an OFDM system.

FIG. 13 shows a block diagram a base station 1310 and a wireless device 1350 in an OFDM system 1300. Base station 1310 is generally a fixed station and may also be referred to as a base transceiver system (BTS), an access point, or some other terminology. Wireless device 1350 may be fixed or mobile and may also be referred to as a user terminal, a mobile station, or some other terminology. Wireless device 1350 may also be a portable unit such as a cellular phone, a handheld device, a wireless module, a personal digital assistant (PDA), and the like.

At base station 1310, a TX data and pilot processor 1320 receives different types data (e.g., traffic/packet data and overhead/control data) and processes (e.g., encodes, interleaves, and symbol maps) the received data to generate data symbols. As used herein, a "data symbol" is a modulation symbol for data, a "pilot symbol" is a modulation symbol for pilot, and a modulation symbol is a complex value for a point in a signal constellation for a modulation scheme (e.g., M-PSK, M-QAM, and so on). Processor 1320 also processes pilot data to generate pilot symbols and provides the data and pilot symbols to an OFDM modulator 1330.

OFDM modulator 1330 multiplexes the data and pilot symbols onto the proper subbands and symbol periods and further performs OFDM modulation on the multiplexed symbols to generate OFDM symbols, as described below. A transmitter unit (TMTR) 1332 converts the OFDM symbols into one or more analog signals and further conditions (e.g., amplifies, filters, and frequency upconverts) the analog signal(s) to generate a modulated signal. Base station 1310 then transmits the modulated signal from an antenna 1334 to wireless devices in the system.

At wireless device 1350, the transmitted signal from base station 1310 is received by an antenna 1352 and provided to a receiver unit (RCVR) 1354. Receiver unit 1354 conditions (e.g., filters, amplifies, and frequency downconverts) the received signal and digitizes the conditioned signal to obtain a stream input samples. An OFDM demodulator 1360 performs OFDM demodulation on the input samples to obtain received data and pilot symbols. OFDM demodulator 1360 also performs detection (e.g., matched filtering) on the received data symbols with a channel estimate (e.g., a frequency response estimate) to obtain detected data symbols, which are estimates the data symbols sent by base station 1310. OFDM demodulator 1360 provides the detected data symbols to a receive (RX) data processor 1370.

A synchronization/channel estimation unit 1380 receives the input samples from receiver unit 1354 and performs synchronization to determine frame and symbol timing, as described above and below. Unit 1380 also derives the channel estimate using received pilot symbols from OFDM demodulator 1360. Unit 1380 provides the symbol timing and channel estimate to OFDM demodulator 1360 and may provide the frame timing to RX data processor 1370 and/or a controller 1390. OFDM demodulator 1360 uses the symbol timing to perform OFDM demodulation and uses the channel estimate to perform detection on the received data symbols.

RX data processor 1370 processes (e.g., symbol demaps, deinterleaves, and decodes) the detected data symbols from OFDM demodulator 1360 and provides decoded data. RX data processor 1370 and/or controller 1390 may use the frame timing to recover different types data sent by base station 1310. In general, the processing by OFDM demodulator 1360 and RX data processor 1370 is complementary to the processing by OFDM modulator 1330 and TX data and pilot processor 1320, respectively, at base station 1310.

Controllers 1340 and 1390 direct operation at base station 110 and wireless device 1350, respectively. Memory units 1342 and 1392 provide storage for program codes and data used by controllers 1340 and 1390, respectively.

Base station 1310 may send a point-to-point transmission to a single wireless device, a multi-cast transmission to a group wireless devices, a broadcast transmission to all wireless devices under its coverage area, or any combination thereof. For example, base station 1310 may broadcast pilot and overhead/control data to all wireless devices under its coverage area. Base station 1310 may further transmit user-specific data to specific wireless devices, multi-cast data to a group wireless devices, and/or broadcast data to all wireless devices.

FIG. 14 shows a super-frame structure 1400 that may be used for OFDM system 1300. Data and pilot may be transmitted in super-frames, with each super-frame having a predetermined time duration (e.g., one second). A super-frame may also be referred to as a frame, a time slot, or some other terminology. For the embodiment shown in FIG. 14, each super-frame includes a field 1412 for a first TDM pilot (or "TDM pilot-1"), a field 1414 for a second TDM pilot (or "TDM pilot-2"), a field 1416 for overhead/control data, and a field 1418 for traffic/packet data.

The four fields 1412 through 1418 are time division multiplexed in each super-frame such that only one field is transmitted at any given moment. The four fields are also arranged in the order shown in FIG. 14 to facilitate synchronization and data recovery. Pilot OFDM symbols in fields 1412 and 1414, which are transmitted first in each super-frame, may be used for detection overhead OFDM symbols in field 1416, which is transmitted next in the super-frame. Overhead information obtained from field 1416 may then be used for recovery traffic/packet data sent in field 1418, which is transmitted last in the super-frame.

In an exemplary embodiment, field 1412 carries one OFDM symbol for TDM pilot-1, and field 1414 also carries one OFDM symbol for TDM pilot-2. In general, each field may be any duration, and the fields may be arranged in any order. TDM pilot-1 and TDM pilot-2 are broadcast periodically in each frame to facilitate synchronization by the wireless devices. Overhead field 1416 and/or data field 1418 may also contain pilot symbols that are frequency division multiplexed with data symbols, as described below.

The OFDM system has an overall system bandwidth BW MHz, which is partitioned into N orthogonal subbands using OFDM. The spacing between adjacent subbands is BW/N MHz. Of the N total subbands, M subbands may be used for pilot and data transmission, where M<N, and the remaining N–M subbands may be unused and serve as guard subbands. In an embodiment, the OFDM system uses an OFDM structure with N=4096 total subbands, M=4000 usable subbands, and N–M=96 guard subbands. In general, any OFDM structure with any number total, usable, and guard subbands may be used for the OFDM system.

As described supra, TDM pilots 1 and 2 may be designed to facilitate synchronization by the wireless devices in the system. A wireless device may use TDM pilot-1 to detect the start each frame, obtain a coarse estimate symbol timing, and estimate frequency error. The wireless device may subsequently use TDM pilot-2 to obtain more accurate symbol timing.

FIG. 15*a* shows an embodiment TDM pilot-1 in the frequency domain. For this embodiment, TDM pilot-1 comprises $L_1$ pilot symbols that are transmitted on $L_1$ subbands, one pilot symbol per subband used for TDM pilot-1. The $L_1$ subbands are uniformly distributed across the N total subbands and are equally spaced apart by $S_1$ subbands, where $S_1=N/L_1$. For example, N=4096, $L_1$=128, and $S_1$=32. However, other values may also be used for N, $L_1$, and $S_1$. This structure for TDM pilot-1 can (1) provide good performance for frame detection in various types channel including a severe multi-path channel, (2) provide a sufficiently accurate frequency error estimate and coarse symbol timing in a severe multi-path channel, and (3) simplify the processing at the wireless devices, as described below.

FIG. 15*b* shows an embodiment TDM pilot-2 in the frequency domain. For this embodiment, TDM pilot-2 comprises $L_2$ pilot symbols that are transmitted on $L_2$ subbands, where $L_2>L_1$. The $L_2$ subbands are uniformly distributed across the N total subbands and are equally spaced apart by $S_2$ subbands, where $S_2=N/L_2$. For example, N=4096, $L_2$=2048, and $S_2$=2. Again, other values may also be used for N, $L_2$, and $S_2$. This structure for TDM pilot-2 can provide accurate symbol timing in various types of channel including a severe multi-path channel. The wireless devices may also be able to (1) process TDM pilot-2 in an efficient manner to obtain symbol timing prior to the arrival the next OFDM symbol, which is can occur immediately after TDM pilot-2, and (2) apply the symbol timing to this next OFDM symbol, as described below.

A smaller value is used for $L_1$ so that a larger frequency error can be corrected with TDM pilot-1. A larger value is used for $L_2$ so that the pilot-2 sequence is longer, which allows a wireless device to obtain a longer channel impulse response estimate from the pilot-2 sequence. The $L_1$ subbands for TDM pilot-1 are selected such that $S_1$ identical pilot-1 sequences are generated for TDM pilot-1. Similarly, the $L_2$ subbands for TDM pilot-2 are selected such that $S_2$ identical pilot-2 sequences are generated for TDM pilot-2.

Figure 16:
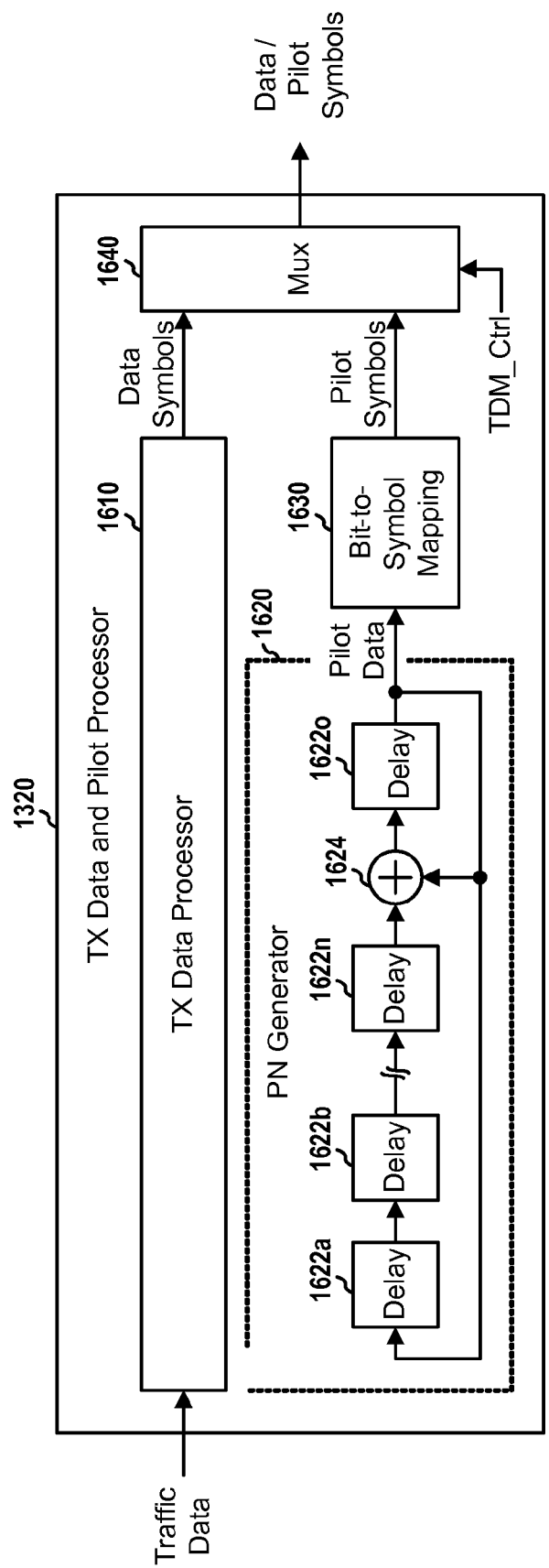
FIG. 16 is a block diagram an embodiment TX data and pilot processor at a base station.

FIG. 16 shows a block diagram an embodiment TX data and pilot processor 1320 at base station 1310. Within processor 1320, a TX data processor 1610 receives, encodes, interleaves, and symbol maps traffic/packet data to generate data symbols.

In an embodiment, a pseudo-random number (PN) generator 1620 is used to generate data for both TDM pilots 1 and 2. PN generator 1620 may be implemented, for example, with a 15-tap linear feedback shift register (LFSR) that implements a generator polynomial $g(x)=x^{15}+x^{14}+1$. In this case, PN generator 1620 includes (1) 15 delay elements 1622*a* through 1622o coupled in series and (2) a summer 1624 coupled between delay elements 1622n and 1622o. Delay element 1622o provides pilot data, which is also fed back to the input delay element 1622a and to one input of summer 1624. PN generator 1620 may be initialized with different initial states for TDM pilots 1 and 2, e.g., to '011010101001110' for TDM pilot-1 and to '010110100011100' for TDM pilot-2. In general, any data may be used for TDM pilots 1 and 2. The pilot data may be selected to reduce the difference between the peak amplitude and the average amplitude a pilot OFDM symbol (i.e., to minimize the peak-to-average variation in the time-domain waveform for the TDM pilot). The pilot data for TDM pilot-2 may also be generated with the same PN generator used for scrambling data. The wireless devices have knowledge the data used for TDM pilot-2 but do not need to know the data used for TDM pilot-1.

A bit-to-symbol mapping unit 1630 receives the pilot data from PN generator 1620 and maps the bits the pilot data to pilot symbols based on a modulation scheme. The same or different modulation schemes may be used for TDM pilots 1 and 2. In an embodiment, QPSK is used for both TDM pilots 1 and 2. In this case, mapping unit 1630 groups the pilot data into 2-bit binary values and further maps each 2-bit value to a specific pilot modulation symbol. Each pilot symbol is a complex value in a signal constellation for QPSK. If QPSK is used for the TDM pilots, then mapping unit 1630 maps 2L.sub.1 pilot data bits for TDM pilot 1 to L.sub.1 pilot symbols and further maps 2L.sub.2 pilot data bits for TDM pilot 2 to L.sub.2 pilot symbols. A multiplexer (Mux) 1640 receives the data symbols from TX data processor 1610, the pilot symbols from mapping unit 1630, and a TDM_Ctrl signal from controller 1340. Multiplexer 1640 provides to OFDM modulator 1330 the pilot symbols for the TDM pilot 1 and 2 fields and the data symbols for the overhead and data fields each frame, as shown in FIG. 14.

Figure 17:
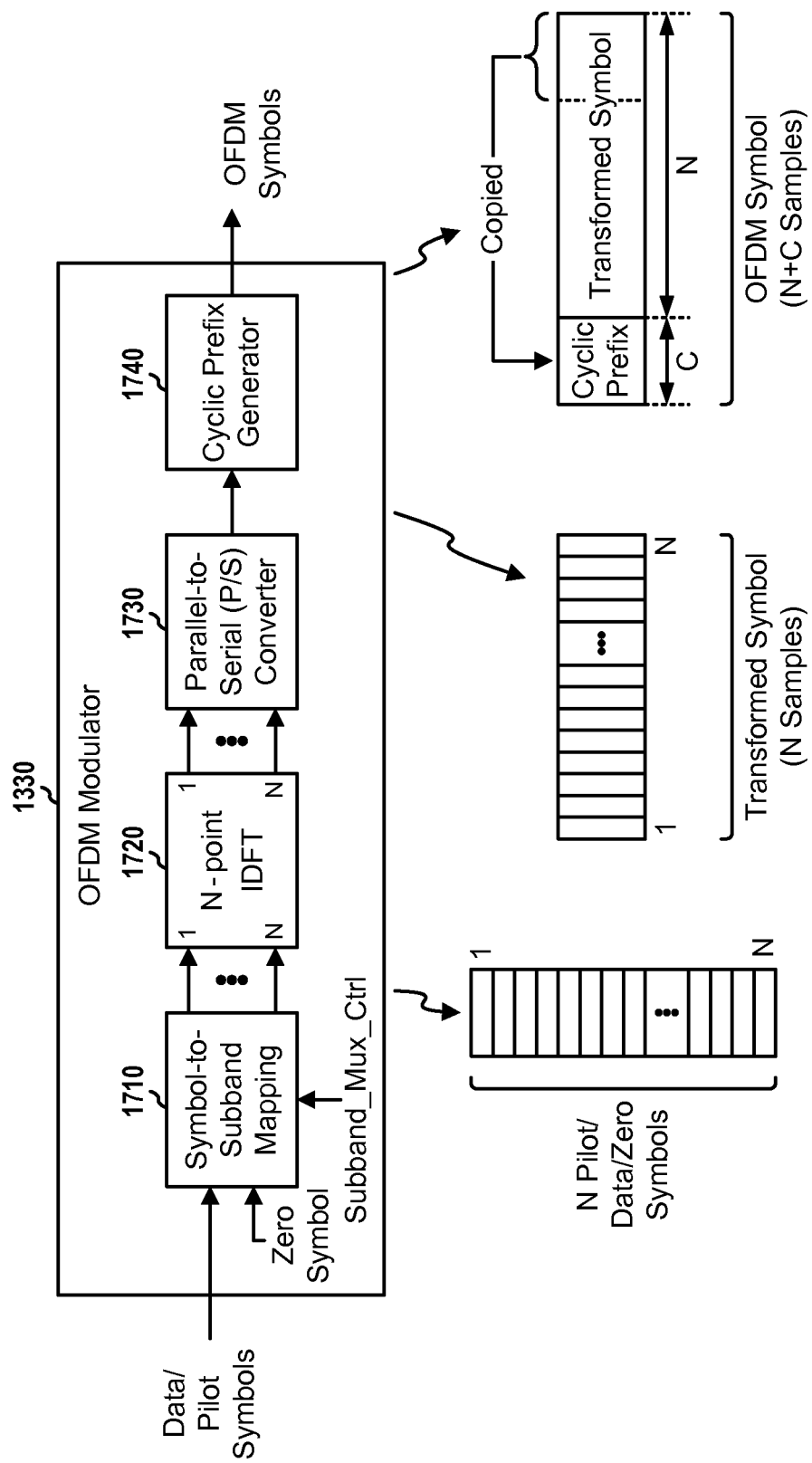
FIG. 17 is a block diagram an embodiment OFDM modulator at a base station.

FIG. 17 shows a block diagram an embodiment OFDM modulator 1330 at base station 1310. A symbol-to-subband mapping unit 1710 receives the data and pilot symbols from TX data and pilot processor 1320 and maps these symbols onto the proper subbands based on a Subband_Mux_Ctrl signal from controller 1340. In each OFDM symbol period, mapping unit 1710 provides one data or pilot symbol on each subband used for data or pilot transmission and a "zero symbol" (which is a signal value zero) for each unused subband. The pilot symbols designated for subbands that are not used are replaced with zero symbols. For each OFDM symbol period, mapping unit 1710 provides N "transmit symbols" for the N total subbands, where each transmit symbol may be a data symbol, a pilot symbol, or a zero symbol. An inverse discrete Fourier transform (IDFT) unit 1720 receives the N transmit symbols for each OFDM symbol period, transforms the N transmit symbols to the time domain with an N-point IDFT, and provides a "transformed" symbol that contains N time-domain samples. Each sample is a complex value to be sent in one sample period. An N-point inverse fast Fourier transform (IFFT) may also be performed in place an N-point IDFT if N is a power two, which is typically the case. A parallel-to-serial (P/S) converter 1730 serializes the N samples for each transformed symbol. A cyclic prefix generator 1740 then repeats a portion (or C samples) each transformed symbol to form an OFDM symbol that contains N+C samples. The cyclic prefix is used to combat inter-symbol interference (ISI) and intercarrier interference (ICI) caused by a long delay spread in the communication channel. Delay spread is the time difference between the earliest arriving signal instance and the latest arriving signal instance at a receiver. An OFDM symbol period (or simply, a "symbol period") is the duration one OFDM symbol and is equal to N+C sample periods.

FIG. 18a shows a time-domain representation TDM pilot-1. An OFDM symbol for TDM pilot-1 (or "pilot-1 OFDM symbol") is composed a transformed symbol length N and a cyclic prefix length C. Because the $L_1$ pilot symbols for TDM pilot 1 are sent on $L_1$ subbands that are evenly spaced apart by $S_1$ subbands, and because zero symbols are sent on the remaining subbands, the transformed symbol for TDM pilot 1 contains $S_1$ identical pilot-1 sequences, with each pilot-1 sequence containing $L_1$ time-domain samples. Each pilot-1 sequence may also be generated by performing an $L_1$-point IDFT on the $L_1$ pilot symbols for TDM pilot 1. The cyclic prefix for TDM pilot-1 is composed the C rightmost samples the transformed symbol and is inserted in front the transformed symbol. The pilot-1 OFDM symbol thus contains a total $S_1+C/L_1$ pilot-1 sequences. For example, if N=4096, $L_1$=128, $S_1$=32, and C=512, then the pilot-1 OFDM symbol would contain 36 pilot-1 sequences, with each pilot-1 sequence containing 128 time-domain samples.

FIG. 18b shows a time-domain representation TDM pilot-2. An OFDM symbol for TDM pilot-2 (or "pilot-2 OFDM symbol") is also composed a transformed symbol length N and a cyclic prefix length C. The transformed symbol for TDM pilot 2 contains $S_2$ identical pilot-2 sequences, with each pilot-2 sequence containing $L_2$ time-domain samples. The cyclic prefix for TDM pilot 2 is composed the C rightmost samples the transformed symbol and is inserted in front the transformed symbol. For example, if N=4096, $L_2$=2048, $S_2$=2, and C=512, then the pilot-2 OFDM symbol would contain two complete pilot-2 sequences, with each pilot-2 sequence containing 2048 time-domain samples. The cyclic prefix for TDM pilot 2 would contain only a portion the pilot-2 sequence.

Figure 19:
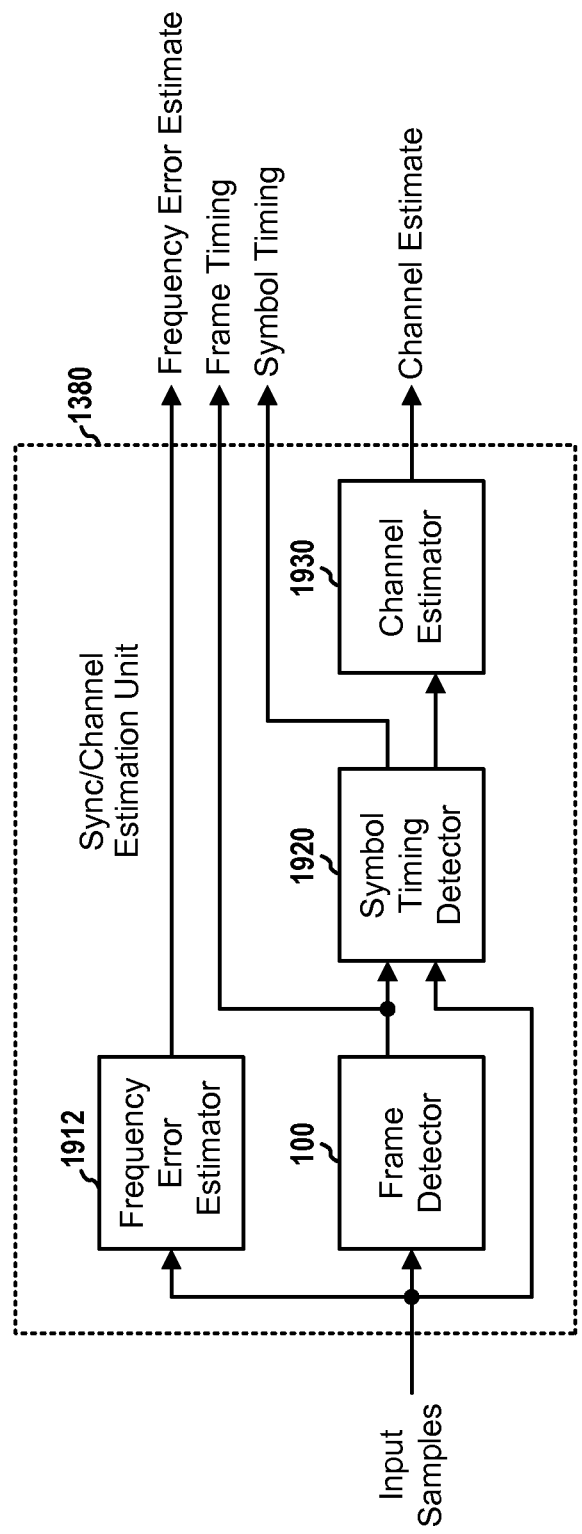
FIG. 19 is a block diagram an embodiment synchronization and channel estimation unit at a wireless device.

FIG. 19 shows a block diagram an embodiment synchronization and channel estimation unit 1380 at wireless device 1350 (FIG. 13). Within unit 1380, a frame detector 100 (as described in detail in supra) receives the input samples from receiver unit 1354, processes the input samples to detect for the start each frame, and provides the frame timing. A symbol timing detector 1920 receives the input samples and the frame timing, processes the input samples to detect for the start the received OFDM symbols, and provides the symbol timing. A frequency error estimator 1912 estimates the frequency error in the received OFDM symbols. A channel estimator 1930 receives an output from symbol timing detector 1920 and derives the channel estimate.

As described in further detail in FIG. 1, frame detector 100, performs frame synchronization by detecting, for example, for TDM pilot-1 in the input samples from receiver unit 1354. For simplicity, the instant detailed description assumes that the communication channel is an additive white Gaussian noise (AWGN) channel. The input sample for each sample period may be expressed as:

$$r_n = x_n + w_n,$$  Eq (2)

where n is an index for sample period;

$x_n$ is a time-domain sample sent by the base station in sample period n;

$r_n$ is an input sample obtained by the wireless device in sample period n; and $w_n$ is the noise for sample period n.

Frequency error estimator 1912 estimates the frequency error in the received pilot-1 OFDM symbol. This frequency error may be due to various sources such as, for example, a difference in the frequencies the oscillators at the base station and wireless device, Doppler shift, and so on. Frequency error estimator 1912 may generate a frequency error estimate for each pilot-1 sequence (except for the last pilot-1 sequence), as follows:

$$\Delta f_\ell = \frac{1}{G_D} \text{Arg}\left[\sum_{i=1}^{L_1} r_{\ell,i} \cdot r^*_{\ell,i+L_1}\right], \quad \text{Eq (1)}$$

where $r_{l,i}$ is the i-th input sample for the l-th pilot-1 sequence;

Arg(x) is the arc-tangent the ratio the imaginary component x over the real component x, or Arg(x)=arctan [Im (x)/Re(x)];

$G_D$ is a detector gain, which is $$G_D = \frac{2\pi \cdot L_1}{f_{samp}};$$

and $\Delta f_l$ is the frequency error estimate for the l-th pilot-1 sequence.

The range detectable frequency errors may be given as:

$$2\pi \cdot L_1 \cdot \frac{|\Delta f_\ell|}{f_{samp}} < \pi/2, \text{ or } |\Delta f_\ell| < \frac{f_{samp}}{4 \cdot L_1}, \quad \text{Eq (2)}$$

where $f_{samp}$ is the input sample rate. Equation (2) indicates that the range detected frequency errors is dependent on, and inversely related to, the length the pilot-1 sequence. Frequency error estimator 1912 may also be implemented within the frame detector component 100 and more specifically by way the delayed correlator component 110 since the accumulated correlation results are also available from summer 524.

The frequency error estimates may be used in various manners. For example, the frequency error estimate for each pilot-1 sequence may be used to update a frequency tracking loop that attempts to correct for any detected frequency error at the wireless device. The frequency-tracking loop may be a phase-locked loop (PLL) that can adjust the frequency a carrier signal used for frequency downconversion at the wireless device. The frequency error estimates may also be averaged to obtain a single frequency error estimate Δf for the pilot-1 OFDM symbol. This Δf may then be used for frequency error correction either prior to or after the N-point DFT within OFDM demodulator 160. For post-DFT frequency error correction, which may be used to correct a frequency offset Δf that is an integer multiple the subband spacing, the received symbols from the N-point DFT may be translated by Δf subbands, and a frequency-corrected symbol $\tilde{R}_k$ for each applicable subband k may be obtained as $\tilde{R}_k = \tilde{R}_{k+\Delta f}$. For pre-DFT frequency error correction, the input samples may be phase rotated by the frequency error estimate Δf, and the N-point DFT may then be performed on the phase-rotated samples.

Frame detection and frequency error estimation may also be performed in other manners based on the pilot-1 OFDM symbol. For example, frame detection may be achieved by performing a direct correlation between the input samples for pilot-1 OFDM symbol with the actual pilot-1 sequence generated at the base station. The direct correlation provides a high correlation result for each strong signal instance (or multipath). Since more than one multipath or peak may be obtained for a given base station, a wireless device would perform post-processing on the detected peaks to obtain timing information. Frame detection may also be achieved with a combination of delayed correlation and direct correlation.

Figure 20:
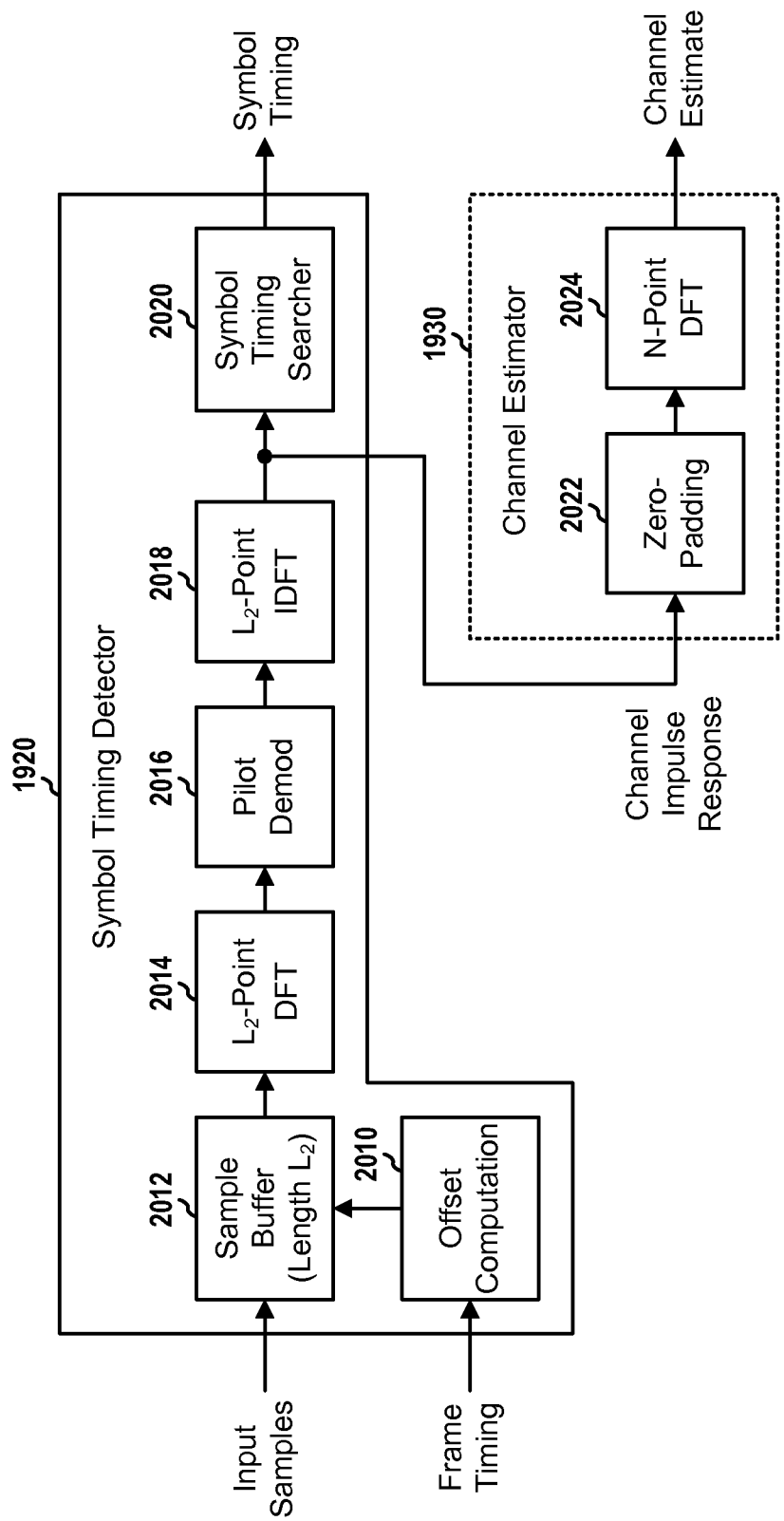
FIG. 20 is a block diagram an embodiment symbol timing detector that performs timing synchronization based on the pilot-2 OFDM symbol.

FIG. 20 shows a block diagram an embodiment symbol timing detector 1920, which performs timing synchronization based on the pilot-2 OFDM symbol. Within symbol timing detector 1920, a sample buffer 2012 receives the input samples from receiver unit 1354 and stores a "sample" window $L_2$ input samples for the pilot-2 OFDM symbol. The start the sample window is determined by a unit 2010 based on the frame timing from frame detector 100.

FIG. 21a shows a timing diagram the processing for the pilot-2 OFDM symbol. Frame detector 100 provides the coarse symbol timing (denoted as $T_C$) based on the pilot-1 OFDM symbol. The pilot-2 OFDM symbol contains $S_2$ identical pilot-2 sequences length $L_2$ (e.g., two pilot-2 sequences length 2048 if N=4096 and $L_2$=2048). A window $L_2$ input samples is collected by sample buffer 912 for the pilot-2 OFDM symbol starting at sample period $T_W$. The start the sample window is delayed by an initial offset $OS_{init}$ from the coarse symbol timing, or $T_W = T_C + OS_{init}$. The initial offset does not need to be accurate and is selected to ensure that one complete pilot-2 sequence is collected in sample buffer 2012. The initial offset may also be selected such that the processing for the pilot-2 OFDM symbol can be completed before the arrival the next OFDM symbol, so that the symbol timing obtained from the pilot-2 OFDM symbol may be applied to this next OFDM symbol.

Referring back to FIG. 20, a DFT unit 2014 performs an $L_2$-point DFT on the L.sub.2 input samples collected by sample buffer 2012 and provides $L_2$ frequency-domain values for $L_2$ received pilot symbols. If the start the sample window is not aligned with the start the pilot-2 OFDM symbol (i.e., $T_w \neq T_s$), then the channel impulse response is circularly shifted, which means that a front portion the channel impulse response wraps around to the back. A pilot demodulation unit 2016 removes the modulation on the $L_2$ received pilot symbols by multiplying the received pilot symbol $R_k$ for each pilot subband k with the complex-conjugate the known pilot symbol $P^*_k$ for that subband, or $R_k \cdot P^*_k$. Unit 2016 also sets the received pilot symbols for the unused subbands to zero symbols. An IDFT unit 2018 then performs an $L_2$-point IDFT on the $L_2$ pilot demodulated symbols and provides $L_2$ time-domain values, which are $L_2$ taps an impulse response the communication channel between base station 1310 and wireless device 1350.

FIG. 21b shows the $L_2$-tap channel impulse response from IDFT unit 2018. Each the $L_2$ taps is associated with a complex channel gain at that tap delay. The channel impulse response may be cyclically shifted, which means that the tail portion of the channel impulse response may wrap around and appear in the early portion the output from IDFT unit 2018.

Referring back to FIG. 20, a symbol timing searcher 2020 may determine the symbol timing by searching for the peak in the energy the channel impulse response. The peak detection may be achieved by sliding a "detection" window across the channel impulse response, as indicated in FIG. 21b. The detection window size may be determined as described below. At each window starting position, the energy all taps falling within the detection window is computed.

FIG. 21c shows a plot the energy the channel taps at different window starting positions. The detection window is shifted to the right circularly so that when the right edge the detection window reaches the last tap at index $L_2$, the window wraps around to the first tap at index 1. Energy is thus collected for the same number of channel taps for each window starting position.

The detection window size $L_W$ may be selected based on the expected delay spread the system. The delay spread at a wireless device is the time difference between the earliest and latest arriving signal components at the wireless device. The delay spread the system is the largest delay spread among all wireless devices in the system. If the detection window size is equal to or larger than the delay spread the system, then the detection window, when properly aligned, would capture all the energy the channel impulse response. The detection window size $L_W$ may also be selected to be no more than half $L_2$ (or $L_W \leq L_2/2$) to avoid ambiguity in the detection the beginning the channel impulse response. The beginning the channel impulse response may be detected by (1) determining the peak energy among all the $L_2$ window starting positions and (2) identifying the rightmost window starting position with the peak energy, if multiple window starting positions have the same peak energy. The energies for different window starting positions may also be averaged or filtered to obtain a more accurate estimate the beginning the channel impulse response in a noisy channel. In any case, the beginning the channel impulse response is denoted as $T_B$, and the offset between the start the sample window and the beginning the channel impulse response is $T_{OS} = T_B - T_W$. Fine symbol timing may be uniquely computed once the beginning the channel impulse response $T_B$ is determined.

Referring to FIG. 21a, the fine symbol timing is indicative the start the received OFDM symbol. The fine symbol timing $T_S$ may be used to accurately and properly place a "DFT" window for each subsequently received OFDM symbol. The DFT window indicates the specific N input samples (from among N+C input samples) to collect for each received OFDM symbol. The N input samples within the DFT window are then transformed with an N-point DFT to obtain N received data/pilot symbols for the received OFDM symbol. Accurate placement the DFT window for each received OFDM symbol is needed in order to avoid (1) inter-symbol interference (ISI) from a preceding or next OFDM symbol, (2) degradation in channel estimation (e.g., improper DFT window placement may result in an erroneous channel estimate), (3) errors in processes that rely on the cyclic prefix (e.g., frequency tracking loop, automatic gain control (AGC), and so on), and (4) other deleterious effects.

The pilot-2 OFDM symbol may also be used to obtain a more accurate frequency error estimate. For example, the frequency error may be estimated using the pilot-2 sequences and based on equation (3). In this case, the summation is performed over $L_2$ samples (instead $L_1$ samples) for the pilot-2 sequence.

The channel impulse response from IDFT unit 2018 may also be used to derive a frequency response estimate for the communication channel between base station 1310 and wireless device 1350. A unit 2022 receives the $L_2$-tap channel impulse response, circularly shifts the channel impulse response so that the beginning the channel impulse response is at index 1, inserts an appropriate number zeros after the circularly-shifted channel impulse response, and provides an N-tap channel impulse response. A DFT unit 2024 then performs an N-point DFT on the N-tap channel impulse response and provides the frequency response estimate, which is composed of N complex channel gains for the N total subbands. OFDM demodulator 1360 may use the frequency response estimate for detection received data symbols in subsequent OFDM symbols. The channel estimate may also be derived in some other manner.

Figure 22:
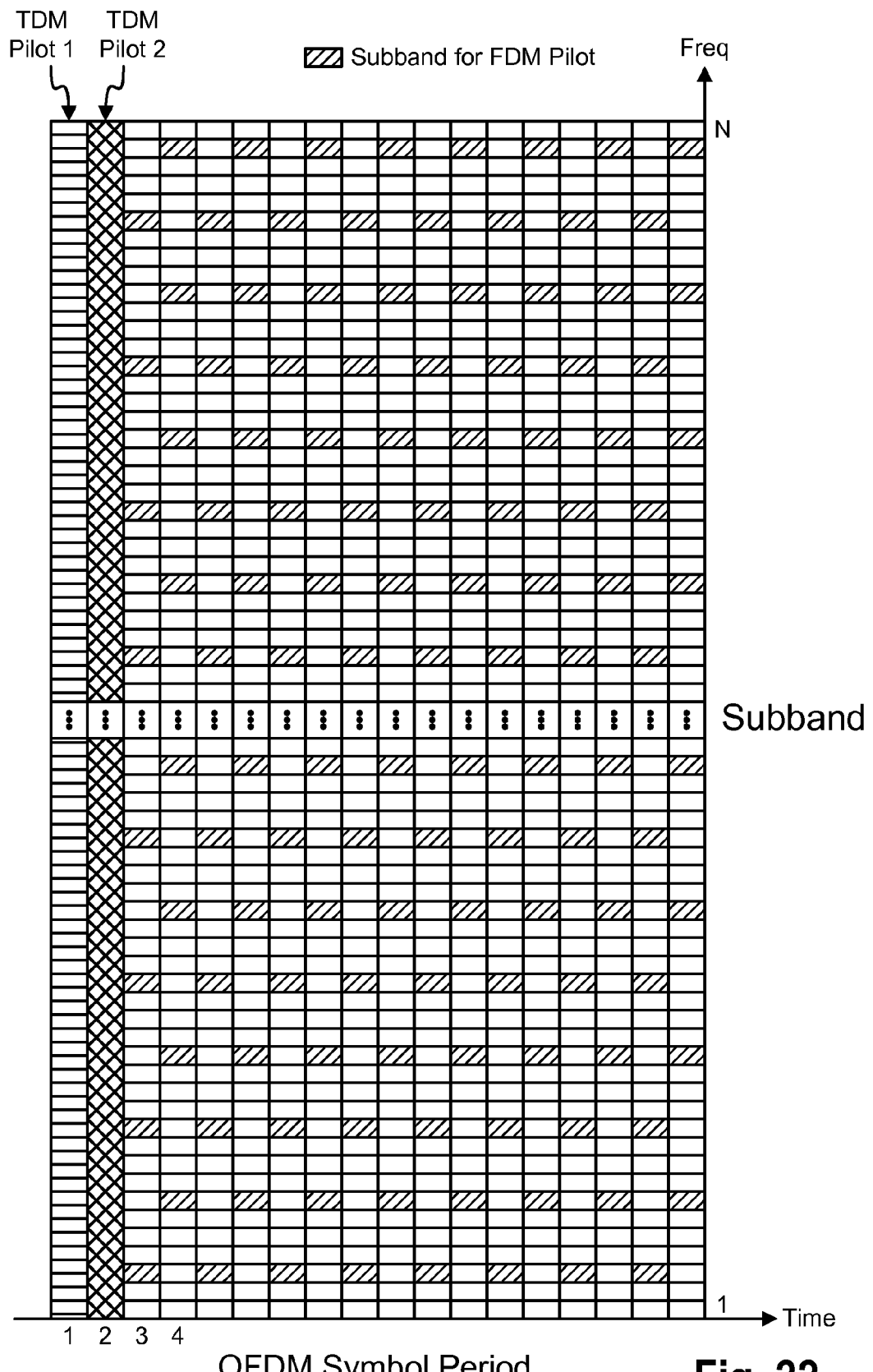
FIG. 22 is a diagram a pilot transmission scheme with a combination of TDM and FDM pilots.

FIG. 22 shows a pilot transmission scheme with a combination TDM and FDM pilots. Base station 1310 may transmit TDM pilots 1 and 2 in each super-frame to facilitate initial acquisition by the wireless devices. The overhead for the TDM pilots is two OFDM symbols, which may be small compared to the size the super-frame. The base station 1310 may also transmit an FDM pilot in all, most, or some the remaining OFDM symbols in each super-frame. For the embodiment shown in FIG. 22, the FDM pilot is sent on alternating sets subbands such that pilot symbols are sent on one set of subbands in even-numbered symbol periods and on another set subbands in odd-numbered symbol periods. Each set contains a sufficient number ($L_{fdm}$) subbands to support channel estimation and possibly frequency and time tracking by the wireless devices. The subbands in each set may be uniformly distributed across the N total subbands and evenly spaced apart by $S_{fdm} = N/L_{fdm}$ subbands. Furthermore, the subbands in one set may be staggered or offset with respect to the subbands in the other set, so that the subbands in the two sets are interlaced with one another. As an example, N=4096, $L_{fdm}$=512, $S_{fdm}$=8, and the subbands in the two sets may be staggered by four subbands. In general, any number subband sets may be used for the FDM pilot, and each set may contain any number subbands and any one the N total subbands.

A wireless device may use TDM pilots 1 and 2 for initial synchronization, for example for frame synchronization, frequency offset estimation, and fine symbol timing acquisition (for proper placement the DFT window for subsequent OFDM symbols). The wireless device may perform initial synchronization, for example, when accessing a base station for the first time, when receiving or requesting data for the first time or after a long period inactivity, when first powered on, and so on.

The wireless device may perform delayed correlation the pilot-1 sequences to detect for the presence a pilot-1 OFDM symbol and thus the start a super-frame, as described above. Thereafter, the wireless device may use the pilot-1 sequences to estimate the frequency error in the pilot-1 OFDM symbol and to correct for this frequency error prior to receiving the pilot-2 OFDM symbol. The pilot-1 OFDM symbol allows for estimation a larger frequency error and for more reliable placement the DFT window for the next (pilot-2) OFDM symbol than conventional methods that use the cyclic prefix structure the data OFDM symbols. The pilot-1 OFDM symbol can thus provide improved performance for a terrestrial radio channel with a large multi-path delay spread.

The wireless device may use the pilot-2 OFDM symbol to obtain fine symbol timing to more accurately place the DFT window for subsequent received OFDM symbols. The wireless device may also use the pilot-2 OFDM symbol for channel estimation and frequency error estimation. The pilot-2 OFDM symbol allows for fast and accurate determination the fine symbol timing and proper placement of the DFT window.

The wireless device may use the FDM pilot for channel estimation and time tracking and possibly for frequency tracking. The wireless device may obtain an initial channel estimate based on the pilot-2 OFDM symbol, as described above. The wireless device may use the FDM pilot to obtain a more accurate channel estimate, particularly if the FDM pilot is transmitted across the super-frame, as shown in FIG. 11. The wireless device may also use the FDM pilot to update the frequency-tracking loop that can correct for frequency error in the received OFDM symbols. The wireless device may further use the FDM pilot to update a time tracking loop that can account for timing drift in the input samples (e.g., due to changes in the channel impulse response the communication channel).

Figure 23:
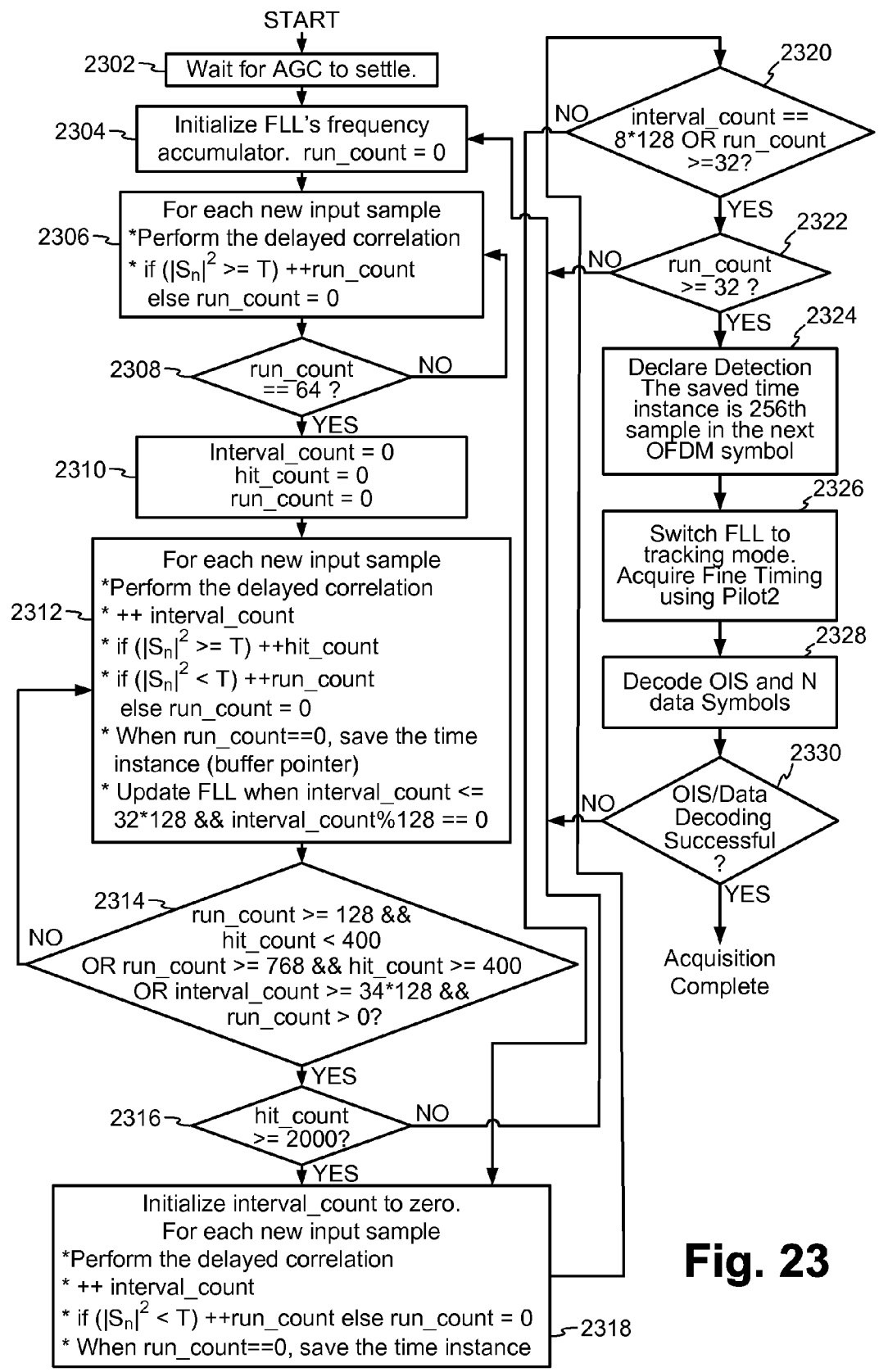
FIG. 23 is a flow chart diagram a detail acquisition procedure in accordance with an embodiment.

FIG. 23 is a flow chart diagram a detail initial acquisition procedure in accordance with an embodiment. Frequency and OFDM symbol timing are also presented.

The initial acquisition procedure based on a first TDM pilot symbol comprises three stages. In the first stage, the leading edge the correlation curve is detected. In an embodiment, the leading edge can be confirmed by detection a flat zone and/or a trailing edge. In alternative embodiment, the leading edge is not confirmed, but is assumed.

At 2302, the process waits for the AGC to settle. The AGC adjusts the input signal to provide a consistent signal strength or level such that the signal can be properly processed. At 2304, a frequency locked loop (FLL) frequency accumulator is initialized and a run count is initialized to zero. The run count counts the number of consecutive input samples.

At 2306, the magnitude square the correlator output S is compared with a programmable threshold T. In detail at 2306, for each new input sample, the process performs the delayed correlation and if $(|S_n|^2 >= T)$, then the run count is incremented, else the run count is re-initialized to zero. $S_n$ denotes the correlator output for a sample n.

At 2308, if the correlator output exceeds the threshold for a consecutive 64 input samples in accordance with an embodiment, then the algorithm enters into the second stage the acquisition process. Otherwise, the flow control proceeds to 2306. Thus, if it is determined that a valid leading edge was not detected at 2308, then the process returns to 2306. In an alternative embodiment, step 2308 is not included since the leading edge is assumed detected and is not confirmed.

In the second stage, at 2310, an interval count, a hit count, and the run count are initialized to zero. In the second stage, a hit count is incremented each time the correlator output exceeds the threshold. The algorithm returns to initial state after it detects that the leading edge observed was a false one. The algorithm stays in the second stage for greater than or equal to predetermined period time or until it observes a consistent trailing edge the correlation curve. If the correlator output remains below threshold for a consecutive 768 input samples, then the algorithm leaves stage two. The closed loop initial frequency acquisition occurs while the algorithm is in stage two. FLL is updated once every 128 input samples while in stage two.

At 2312, for each new input sample, the delayed correlation is performed, the interval count is incremented. If $(|S_n|^2 >= T)$, then the hit count is incremented. If $(|S_n|^2 < T)$, the run count is incremented, else the run count is reinitialized to zero. When the run count equals zero, the time instance is saved, which is used as a buffer pointer. The FLL is updated when the interval count less than or equal to 32*128 and the interval count modulo 128 equals zero.

At 2314, a check is made to determine whether (run count is >=128 and the hit count <400) or (run count >=768 and hit count>=400) or (interval count>=34*128 and run count >0). If yes, then the flow control proceeds to 2316. Otherwise, the flow control proceeds to 2312.

At 2316, a check determines whether hit count is greater or equal to 2000. If yes, then the acquisition process proceeds to 2318. It should be appreciated also that it is at this point where the frequency locked loop can be updated periodically utilizing the frequency accumulator, for example to acquire the initial frequency offset. If no, then the flow control proceeds to 2304.

At 2316, a check determines whether hit count is greater or equal to 2000. If yes, then the acquisition process proceeds to 2304. It should be appreciated also that it is at this point where the frequency locked loop can be updated periodically utilizing the frequency accumulator, for example to acquire the initial frequency offset. If no, then the flow control proceeds to 2318.

At 2318, the interval count is reinitialized to zero. For each new input sample, the delayed correlation is performed and the interval count is incremented. If $(|S_n|^2 < T)$, then the run count is incremented, else the run count is reinitialized to zero. When the run count equals zero, the time instance is saved.

At 2320, a check is made to determine whether the interval count=8*128 or the run count>=32. If no, then the flow control proceeds to 2318. If yes, then the flow control proceeds to step 2322. At 2322, a check is made to determine whether the run count>=32. If no, then the flow control proceeds to 2304. If yes, then the flow control proceeds to 2324.

At 2324, detection is declared and the saved instance is the 256.sup.th sample in the next OFDM symbol. At 2326, the FLL switches to tracking mode. Fine Timing is acquired using Pilot2. At 2328, Overhead Information Symbol (OIS) and N data symbols are decoded.

At 2330, a check is made to determine whether OIS/Data decoding was successful. If no, then the flow control proceeds to 2304. If yes, then acquisition is complete.

At 2320, the trailing edge can be detected if not previously observed. It is here just prior to the initial dip the trailing edge that the time can be saved to be used later for fine timing. If the trailing edge is not detected at 2322 and was not previously detected then the method returns to 2304. If the trailing edge was detected then the initial coarse detection has been completed. The procedure continues at 2326 where the frequency locked loop is switched to tracking mode. Fine timing is acquired utilizing a second TDM pilot symbol and information provided by the prior coarse estimate. In particular, the time instance saved ($T_c$) can correspond to a particular sample offset within the second pilot symbol. In accordance with one embodiment, the saved time sample can correspond to the 256.sup.th sample in the second pilot symbol. Specific algorithms can then be utilized to improve upon that timing estimate as described in later sections. Upon termination fine timing acquisition, one or more data symbols can be retrieved and an attempt made to decode such symbols can be undertaken at 2328. If, at 2330, the decoding was successful then the process terminates. However, if the process was not successful then the methodology returns to 2304

Stage three is for observing the trailing edge if it was not already observed in stage two. In stage three, if the correlator output remains below threshold for a minimum consecutive 32 input samples and hit count during stage two exceeded another programmable threshold, then TDM pilot1 detection is declared and initial frequency acquisition is assumed to be completed. The initial OFDM symbol time estimate is based on the trailing edge. The time instance when the correlator output goes below the threshold for the first time during the observation the trailing edge, is taken as the 256th sample next OFDM symbol (TDM pilot 2). If the hit count is found to be less than the programmable threshold or a consistent trailing edge during a time-out period 1024 input sample in stage three is not observed, then the algorithm resets the counts and the frequency accumulator the FLL and returns to the first stage looking for another leading edge.

Upon successful detection the TDM pilot symbol 1, pilot symbol 2 is used to acquire the fine OFDM symbol timing. Thereafter, an attempt is made to decode the OIS and subsequent N data OFDM symbols. The AFC loop operates in the tracking mode after the first TDM pilot. If the decoding OIS and data OFDM symbol fails, then it is assumed that AFC loop failed to converge and entire acquisition process is repeated during the next frame.

In a detailed embodiment, a frame structure includes two TDM pilot symbols to acquire the initial time, frequency and frame synchronization. The TDM pilot symbols are known OFDM symbols designed for initial acquisition. The pilot symbols are placed at the beginning each superfame preceding an OIS signal field.

The first TDM pilot symbol has 125 non-zero sub-carriers in the frequency domain. These non-zero sub-carriers are uniformly spaced. Each pair consecutive non-zero sub-carriers is separated by 31 zero sub-carriers. The frequency index 16 is assigned to the first non-zero sub-carrier. A PN sequence length 125 is used for the binary modulation non-zero sub-carriers. Such a structure in frequency domain results in a periodic sequence in time domain with periodicity equal to 128 samples. Thus, the first pilot symbol in time domain has 36 replicas (including the cyclic prefix) a sequence length 128. Such a pilot structure not only simplifies the implementation, it is also well suited for frequency estimation and frame boundary detection in severe multi-path channel.

Though the first pilot can provide sufficiently accurate frequency estimate in severe multi-path channel, it cannot provide fine OFDM symbol timing in such a channel. It can only provide coarse OFDM symbol timing along with the frame boundary. The second pilot symbol has been included to obtain the fine OFDM symbol timing. Its structure is chosen with the goal that it share the same hardware resources meant for symbol time tracking. Recall that symbol time tracking uses 1000 FDM pilot sub-carriers staggered over two adjacent OFDM symbols. The second TDM pilot symbol has 1000 non-zero sub-carriers in the frequency domain at the locations corresponding to the staggered FDM pilot locations in two adjacent data OFDM symbols. The pilot sub-carriers are uniformly spaced and each pair non-zero sub-carriers is separated by three zero sub-carriers. The frequency index 48 is assigned to the first pilot sub-carrier. A PN sequence length 1000 is used for the binary modulation the pilot sub-carriers. Such a structure in frequency domain results in a periodic sequence in time domain with periodicity equal to 1024 samples. Thus the second pilot symbol in time domain has 4 replicas (excluding the cyclic prefix) a sequence length 1024. This structure reuses the same hardware used for symbol time tracking and achieves the fine symbol timing well within the second pilot symbol.

The initial frequency offset needs to be acquired with a factor 2 uncertainty in VCXO gain sensitivity. In addition, 68 micro sec PDM time constant is assumed.

It would be apparent to those skilled in the art that other values might be used rather than those shown in the detailed embodiment immediately above.

In accordance with an embodiment, the frame structure with TDM pilots and structure pilot symbols in frequency and time domains are shown FIGS. 24 to 27.

Figure 24:
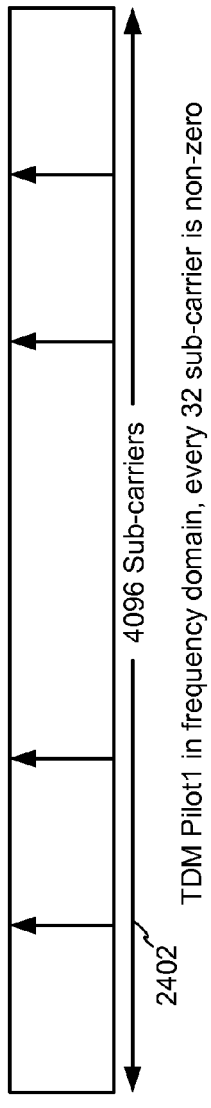
FIG. 24 shows TDM Pilot1 in the frequency domain in accordance with an embodiment.
Figure 25:
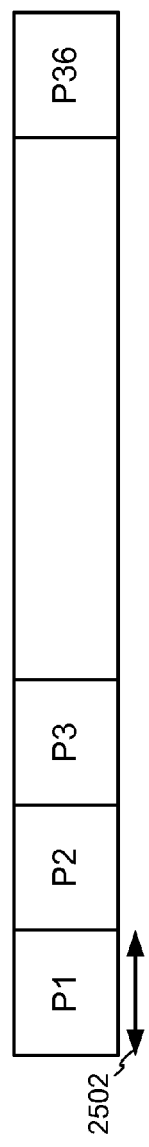
FIG. 25 shows in accordance with an embodiment, a TDM Pilot1 in the time domain with periodic waveform, periodicity 128 samples, and 36 periods.
Figure 26:
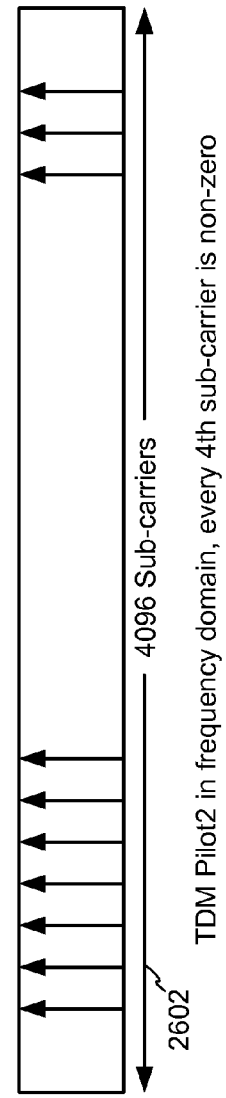
FIG. 26 shows a TDM Pilot2 in the frequency domain in accordance with an embodiment.
Figure 27:
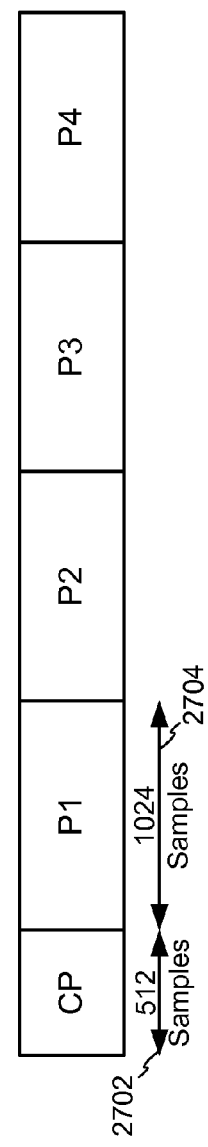
FIG. 27 shows in accordance with an embodiment, a TDM Pilot2 in the time domain with periodic waveform, periodicity 1024 samples, and four periods.

FIG. 24 shows TDM Pilot1 in the frequency domain in accordance with an embodiment. Every 32 sub-carrier is non-zero. 4096 sub-carriers 2402 are shown. FIG. 25 shows in accordance with an embodiment, a TDM Pilot1 in the time domain with periodic waveform, periodicity 128 samples, and 36 periods. 128 samples 2502 are shown. FIG. 26 shows a TDM Pilot2 in the frequency domain in accordance with an embodiment. Every fourth sub-carrier is non-zero. 4096 sub-carriers 2602 are shown. FIG. 27 shows in accordance with an embodiment, a TDM Pilot2 in the time domain with periodic waveform, periodicity 1024 samples, and four periods. 512 samples 2702 and 1024 samples 2704 are shown.

The synchronization techniques described herein may be implemented by various means. For example, these techniques may be implemented in hardware, software, or a combination thereFor a hardware implementation, the processing units at a base station used to support synchronization (e.g., TX data and pilot processor 120) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereThe processing units at a wireless device used to perform synchronization (e.g., synchronization and channel estimation unit 180) may also be implemented within one or more ASICs, DSPs, and so on.

For a software implementation, the synchronization techniques may be implemented in combination with program modules (e.g., routines, programs, components, procedures, functions, data structures, schemas . . . ) that perform the various functions described herein. The software codes may be stored in a memory unit (e.g. memory unit 1392 in FIG. 13) and executed by a processor (e.g., controller 190). The memory unit may be implemented within the processor or external to the processor. Moreover, those skilled in the art will appreciate that the subject inventive methods may be practiced with other computer system configurations, including single-processor or multiprocessor computer systems, mini-computing devices, mainframe computers, as well as personal computers, hand-held computing devices, microprocessor-based or programmable consumer electronics, and the like.

As used herein, OFDM may also include an orthogonal frequency division multiple access (OFDMA) architecture where multiple users share the OFDM channels.

What has been described above includes examples various aspects and embodiments. It is, course, not possible to describe every conceivable combination components or methodologies. Various modifications to these embodiments will be readily apparent to those skill in the art, and the generic principles defined herein may be applied to other embodiments without departing from the spirit or scope the aforementioned embodiments. Thus, the disclosed embodiments are not intended to be limited to the aspects and embodiments shown and described herein but is to be accorded the widest scope consistent with the principles and novel features and techniques disclosed herein. Furthermore, to the extent that the term "includes" is used in either the detailed description or the claims, such term is intended to be inclusive in a manner similar to the term "comprising" as "comprising" is interpreted when employed as a transitional word in a claim.

What is claimed:

1. A method reducing false positives when identifying a symbol of a stream input signals that are obscured by noise or multipath effects, comprising:

receiving the stream input signals at least some being associated with a pilot symbol;

generating correlation outputs forming a correlation curve from the signals and delayed copies thereof;

generating first and second running counts when the correlation outputs are above or below a threshold, wherein:

a correlation output that is above the threshold potentially indicates that a symbol is being transmitted at that time, a correlation output that is below the threshold potentially indicates that a symbol is not being transmitted at that time, wherein due to the noise or the multipath effects, ones the correlation outputs are falsely above the threshold during a time period that does not include a symbol and ones the correlation outputs are falsely below the threshold during a time period that does include a symbol;

detecting a potential leading edge the correlation curve based on the first running count;

confirming detection the potential leading based on the second running count, wherein confirming detection of the potential leading edge includes determining whether the potential leading is a false leading edge based on the second running count; and in response to confirming the potential leading edge, detecting a trailing edge the curve based on the second running count.

2. A computer implemented method reducing false positives when identifying a symbol broadcast signals that are obscured by noise or multipath effects, comprising:

receiving the broadcast signals that transmit at least a plurality wireless symbols;

generating correlation outputs from the signals and delayed copies thereof;

generating running counts when the correlation outputs are above or below a threshold, wherein:

a correlation output that is above the threshold potentially indicates that a symbol is being transmitted at that time, a correlation output that is below the threshold potentially indicates that a symbol is not being transmitted at that time, wherein due to the noise or the multipath effects, ones the correlation outputs are falsely above the threshold during a time period that does not include a symbol and ones the correlation outputs are falsely below the threshold during a time period that does include a symbol;

detecting a potential leading edge the correlation outputs associated with a first pilot symbol based on a first running count;

confirming detection the potential leading based on the second running count, wherein confirming detection the potential leading edge includes determining whether the potential leading is a false leading edge based on the second running count; and in response to confirming the potential leading edge, detecting a trailing edge the correlation outputs based on a second running count.

3. The method claim 2, wherein the wireless symbols are OFDM symbols.

4. The method claim 2, wherein the first pilot symbol is a TDM pilot symbol.

5. A computer implemented method reducing false positives when identifying a symbol a stream broadcast input signals that are obscured by noise or multipath effects, comprising:

receiving the stream broadcast input signals at least some being associated with a pilot symbol;

generating correlation outputs that form a correlation curve over time from the signals and delayed copies thereof;

generating first and second running counts when the correlation outputs are above or below a threshold, wherein:

a correlation output that is above the threshold potentially indicates that a symbol is being transmitted at that time, a correlation output that is below the threshold potentially indicates that a symbol is not being transmitted at that time, wherein due to the noise or the multipath effects, ones the correlation outputs are falsely above the threshold during a time period that does not include a symbol and ones the correlation outputs are falsely below the threshold during a time period that does include a symbol;

detecting a leading edge the correlation curve based on the first running count;

confirming detection the potential leading based on the second running count, wherein confirming detection the potential leading edge includes determining whether the potential leading is a false leading edge based on the second running count; and in response to confirming the potential leading edge, detecting a trailing edge the correlation curve based on the second running count.

6. The method claim 5, wherein the pilot symbol is an OFDM pilot symbol.

7. A system operative to reduce false positives when identifying a symbol a stream input samples that are obscured by noise or multipath effects comprising:

a microprocessor configured to execute instructions to cause the microprocessor to function as:

a delayed correlator component configured to receive the stream input samples, correlates input samples with delayed versions thereof, and generates a plurality of outputs forming a correlation curve;

a leading edge component configured to receive the outputs, generate a first running count when the outputs are above a threshold, and to detect a potential leading edge the correlation curve based on the first running count;

a confirmation component configured to receive the outputs, generate a second running count based on the outputs, confirm detection the potential leading based on the second running count, wherein confirming detection the potential leading edge includes determining whether the potential leading edge is a false leading edge based on the second running count, and detect a trailing edge the correlation curve based on the second running count in response to a determination that the potential leading edge is not the false leading edge; and a trailing edge component configured to receive the outputs, generate a third running count when the outputs are below the threshold, and to confirm the trailing edge the correlation curve based on the third running count, wherein:

an output that is above the threshold potentially indicates that a symbol is being transmitted at that time, an output that is below the threshold potentially indicates that a symbol is not being transmitted at that time, wherein due to the noise or the multipath effects, ones the outputs are falsely above the threshold during a time period that does not include a symbol and ones the outputs are falsely below the threshold during a time period that does include a symbol.

8. A system operative to reduce false positives when identifying a symbol a stream signals that are obscured by noise or multipath effects comprising:

means for receiving the stream signals at least a portion which are associated with a pilot symbol;

means for generating correlation outputs from the signals and delayed copies thereof;

generating running counts when the correlation outputs are above or below a threshold, wherein:

a correlation output that is above the threshold potentially indicates that a symbol is being transmitted at that time, and a correlation output that is below the threshold potentially indicates that a symbol is not being transmitted at that time, wherein due to the noise or the multipath effects, ones the correlation outputs are falsely above the threshold during a time period that does not include a symbol and ones the correlation outputs are falsely below the threshold during a time period that does include a symbol;

means for detecting a leading edge based on the running counts;

means for confirming detection the potential leading based on the second running count, wherein confirming detection the potential leading edge includes determining whether the potential leading is a false leading edge based on the running counts; and means for detecting a trailing edge the correlation curve based on the running counts in response to confirming the potential leading edge.

9. At least one microprocessor configured for reducing false positives when identifying a symbol signal samples that are obscured by noise or multipath effects, comprising:

a first module for generating correlation metrics from the signal samples and delayed copies thereof;

a second module for generating running counts when the correlation metrics are above or below a threshold, wherein:

a correlation metric that is above the threshold potentially indicates that a symbol is being transmitted at that time, a correlation metric that is below the threshold potentially indicates that a symbol is not being transmitted at that time, wherein due to the noise or the multipath effects, ones the correlation metrics are falsely above the threshold during a time period that does not include a symbol and ones the correlation metrics are falsely below the threshold during a time period that does include a symbol; and a third module for detecting a leading edge based on the generated running counts;

a fourth module for confirming detection the leading based on the generated running counts, wherein confirming detection the potential leading edge includes determining whether the leading is a false leading edge based on the generated running counts; and a fifth module for detecting a trailing edge the correlation curve based on the generated running counts in response to confirming the potential leading edge.

10. The method claim 1, wherein confirming detection the potential leading edge includes at least one of:

determining a predetermined number correlation outputs do not surpass a leading edge threshold; or determining the potential leading edge is detected after a predetermined duration of receiving the stream input signals.

11. The method claim 1, wherein confirming the potential leading edge includes at least one of:

determining a predetermined number correlation outputs do not surpass a leading edge threshold; or determining the potential leading edge is detected after a predetermined duration of receiving the stream input signals.

12. The method claim 5, wherein confirming the potential leading edge includes at least one of:

determining a predetermined number correlation outputs do not surpass a leading edge threshold; or determining the potential leading edge is detected after a predetermined duration of receiving the stream input signals.

13. The timing estimation system claim 7, wherein the confirmation component is further configured for at least one of:

determining a predetermined number correlation outputs do not surpass a leading edge threshold; or determining the potential leading edge is detected after a predetermined duration of receiving the stream input signals.

14. The timing estimation system claim 8, wherein the means for confirming detection the potential leading edge includes at least one of:

means for determining that a predetermined number correlation outputs do not surpass a leading edge threshold; or means for determining that the potential leading edge is detected after a predetermined duration receiving the stream input signals.

15. The method claim 1, wherein generating the running counts comprises generating counts that are indicative a consecutive number times the correlation outputs are above or below the threshold.

16. The computer implemented method claim 2, wherein the first and second running counts are indicative a consecutive number times the correlation outputs are above or below the threshold.

17. The computer implemented method claim 5, wherein the running counts are indicative a consecutive number times the correlation outputs are above or below the threshold.

18. The timing estimation system claim 7, wherein the first running count comprises a consecutive number times the correlation outputs are above the threshold, and wherein the third running count comprises a consecutive number of times the correlation outputs are below the threshold.

19. The timing estimation system claim 8, wherein means for generating the running counts comprises means for generating counts that are indicative a consecutive number times the correlation outputs are above or below the threshold.

20. The microprocessor claim 9, wherein the generated running counts indicate a consecutive number times the correlation outputs are above or below the threshold.

* * * * *